(12) United States Patent
Paradis et al.

(10) Patent No.: US 11,206,273 B2
(45) Date of Patent: Dec. 21, 2021

(54) CONTENT MANAGEMENT SYSTEM CONNECT

(71) Applicant: salesforce.com, inc., San Francisco, CA (US)

(72) Inventors: Jean-Francois Paradis, San Francisco, CA (US); Shipra Shreyasi, San Francisco, CA (US); Sanjaya Lai, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 204 days.

(21) Appl. No.: 15/885,059

(22) Filed: Jan. 31, 2018

(65) Prior Publication Data

US 2019/0238559 A1     Aug. 1, 2019

(51) Int. Cl.
*H04L 29/06* (2006.01)
*H04L 29/08* (2006.01)
(Continued)

(52) U.S. Cl.
CPC ............ *H04L 63/14* (2013.01); *G06F 16/958* (2019.01); *G06F 40/154* (2020.01);
(Continued)

(58) Field of Classification Search
CPC ... H04L 63/14; H04L 63/145; H04L 63/1483; H04L 67/145; H04L 63/04; H04L 67/02; H04L 63/0281; H04L 67/28; H04L 67/306; H04L 67/2842; G06F 40/154; G06F 16/958; G06Q 10/103; G06Q 50/01
See application file for complete search history.

(56) References Cited

U.S. PATENT DOCUMENTS 5,577,188 A    11/1996   Zhu
5,608,872 A     3/1997   Schwartz et al.
(Continued)

OTHER PUBLICATIONS

Crites et al., "OMash: Enabling Secure Web Mashups via Object Abstractions", Oct. 2008 (Year: 2008).*
(Continued)

*Primary Examiner* — Henry Tsang
(74) *Attorney, Agent, or Firm* — Schwabe Williamson & Wyatt

(57) ABSTRACT

In embodiments, a computer program may be stored on a storage medium for securely inserting portions of content maintained on external web servers into an online community web page. The computer program may comprise a set of instructions operable to cause a computer to receive a request to render a web page maintained within a social platform, the web page including embedded settings that refer to content on one or more remote servers. The computer program may further cause the computer to retrieve, at a rendering time of the web page, based at least in part on the embedded settings, content from the one or more remote servers, process the retrieved content in a secured environment according to one or more security protocols and insert it into the web page. In embodiments, the computer program may further cause the computer to render the web page in a main window and the inserted content in an isolated custom window. Related methods and apparatus are also presented.

23 Claims, 20 Drawing Sheets

(51) Int. Cl.
    *G06Q 10/10* (2012.01)
    *G06F 16/958* (2019.01)
    *G06F 40/154* (2020.01)
    *G06Q 50/00* (2012.01)

(52) U.S. Cl.
    CPC ....... *G06Q 10/103* (2013.01); *H04L 63/0281* (2013.01); *H04L 63/04* (2013.01); *H04L 63/145* (2013.01); *H04L 63/1483* (2013.01); *H04L 67/02* (2013.01); *H04L 67/145* (2013.01); *G06Q 50/01* (2013.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,818,940 B2 | 8/2014 | Lai et al. |
| 9,053,136 B2 | 6/2015 | Kuruganti et al. |
| 9,703,799 B2 | 7/2017 | Kuruganti et al. |
| 9,715,555 B2 | 7/2017 | Doshi et al. |
| 10,158,638 B2 | 12/2018 | Micucci et al. |
| 10,218,667 B2 | 2/2019 | Lai et al. |
| 10,324,901 B2 | 6/2019 | Kuruganti et al. |
| 10,324,946 B2 | 6/2019 | Janson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |

(56) References Cited

U.S. PATENT DOCUMENTS

| | | |
|---|---|---|
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0135509 A1* | 7/2003 | Davis ............... H04L 63/0227 |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0005107 A1* | 1/2005 | Touboul ............... G06F 21/51 713/165 |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0249489 A1* | 10/2009 | Livshits ............... H04L 63/1483 726/26 |
| 2011/0218958 A1 | 9/2011 | Warshavsky |
| 2011/0247051 A1 | 10/2011 | Bulumulla |
| 2012/0005429 A1* | 1/2012 | Kalasapur ............ G06F 16/957 711/118 |
| 2012/0036264 A1* | 2/2012 | Jiang ............... H04L 67/02 709/226 |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2012/0317238 A1* | 12/2012 | Beard ............... H04L 63/10 709/219 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2013/0305045 A1* | 11/2013 | Potekhin ............ H04L 67/2847 713/165 |
| 2014/0081953 A1* | 3/2014 | Ingram ............... G06F 16/248 707/722 |
| 2014/0359537 A1 | 12/2014 | Jackobson et al. |
| 2015/0007251 A1* | 1/2015 | Johns ............... H04L 63/20 726/1 |
| 2017/0200178 A1* | 7/2017 | Shiffert ............... G06Q 30/0267 |
| 2018/0367572 A1* | 12/2018 | Frisbie ............... H04L 63/20 |
| 2019/0108598 A1 | 4/2019 | Lai et al. |
| 2019/0238559 A1 | 8/2019 | Paradis et al. |
| 2020/0026739 A1 | 1/2020 | McGuire et al. |
| 2020/0250086 A1 | 8/2020 | Khan et al. |

OTHER PUBLICATIONS

"Google Plus Users", Google+Ripples; Oct. 31, 2011; 3 pages.

Clark, "ES modules: A cartoon deep-dive" Mozilla Hacks (Mar. 2018); 14 pages.

Roberts, "Creating Lightning Components: Single Page Applications", Salesforce Developer Force Blog (Apr. 13, 2015 to May 27, 2015); 33 pages.

"ECMAScript 2020 Language Specification" EMCA-262 Standard 11th Ed. Jun. 2020; 860 pages.

"The JSON Data Interchange Syntax" EMCA-404 Standard 2nd Ed. Dec. 2017; 16 pages.

Miller et al., Safe JavaScript Modules (Dec. 22, 2019); 8 pages.

Tc39/proposals-realms explainer, downloaded from the Internet <https://github.com/tc39/proposal-realms/blob/main/explainer.md> (May 28, 2020); 20 pages.

Patino_tc39/proposals-ses, Draft proposal for SES (Secure EmcaScript) downloaded from the Internet <https://github.com/tc39/proposal-ses> (May 28, 2020); 26 pages.

\* cited by examiner

CONTENT MANAGEMENT SYSTEM CONNECT

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

The technology relates to on-line communities on social platforms, and in particular to systems and methods for securely importing to a community web page remote content stored on one or more content management system(s).

BACKGROUND

Cloud computing "services provide shared resources, software, and" information to computers and other devices upon request or on demand. Cloud computing typically involves the over-the-Internet provision of dynamically-scalable and often virtualized resources. Technological details can be abstracted from end-users, who no longer have need for expertise in, or control over, the technology infrastructure "in the cloud" that supports them. In cloud computing environmentssoftware applications can be accessible over the Internet rather than installed locally on personal or in-house computer systems. Some of the applications or on-demand services provided to end-users can include the ability for a user to create, viewmodify, store and share documents and other files Online communities are often used to connect and facilitate communication among an organization's employees, partners and customers. One type of online community is, for example, Salesforce.com's "Community Cloud."

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
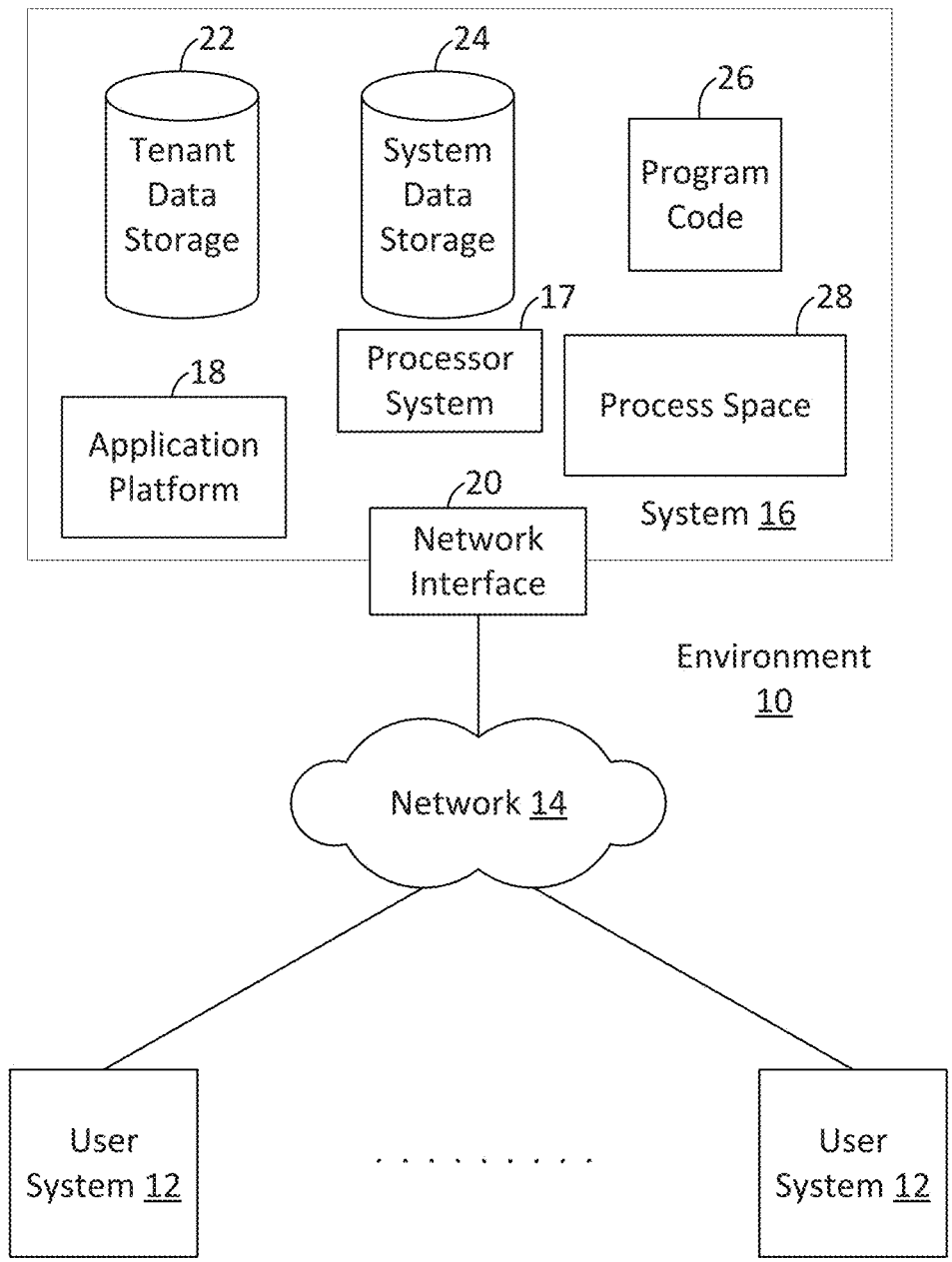
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks,"

have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for securely importing fully rendered content from an external content management system to a community page.

A database system might display a case associated with a customer support query. The database system may initiate a search for other cases related to the new case. The database system may extract relevant terms from the title and/or description provided in the new case using a term weighting algorithm, such as more like this (MLT). The relevant terms are then used in a search query for identifying the related cases.

The database system identifies articles linked to the related cases, ranks the articles, and causes the articles to be displayed on a remote user system in an order based on the ranking. The database system may rank the articles based on a number of related cases linked to the articles. The database system also may rank the article based on other parameters, such as relevancy scores for the related cases, labels assigned to the cases, last modified dates of the related cases, etc.

The database system may identify more relevant articles by first finding related cases that use a similar vocabulary to describe similar customer problems. The database system then identifies the articles that were previously determined to help resolve the prior problems. Thus, the database system may bridge the gap between vocabularies used by customers to describe problems and vocabularies used in articles to describe solutions to those problems.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
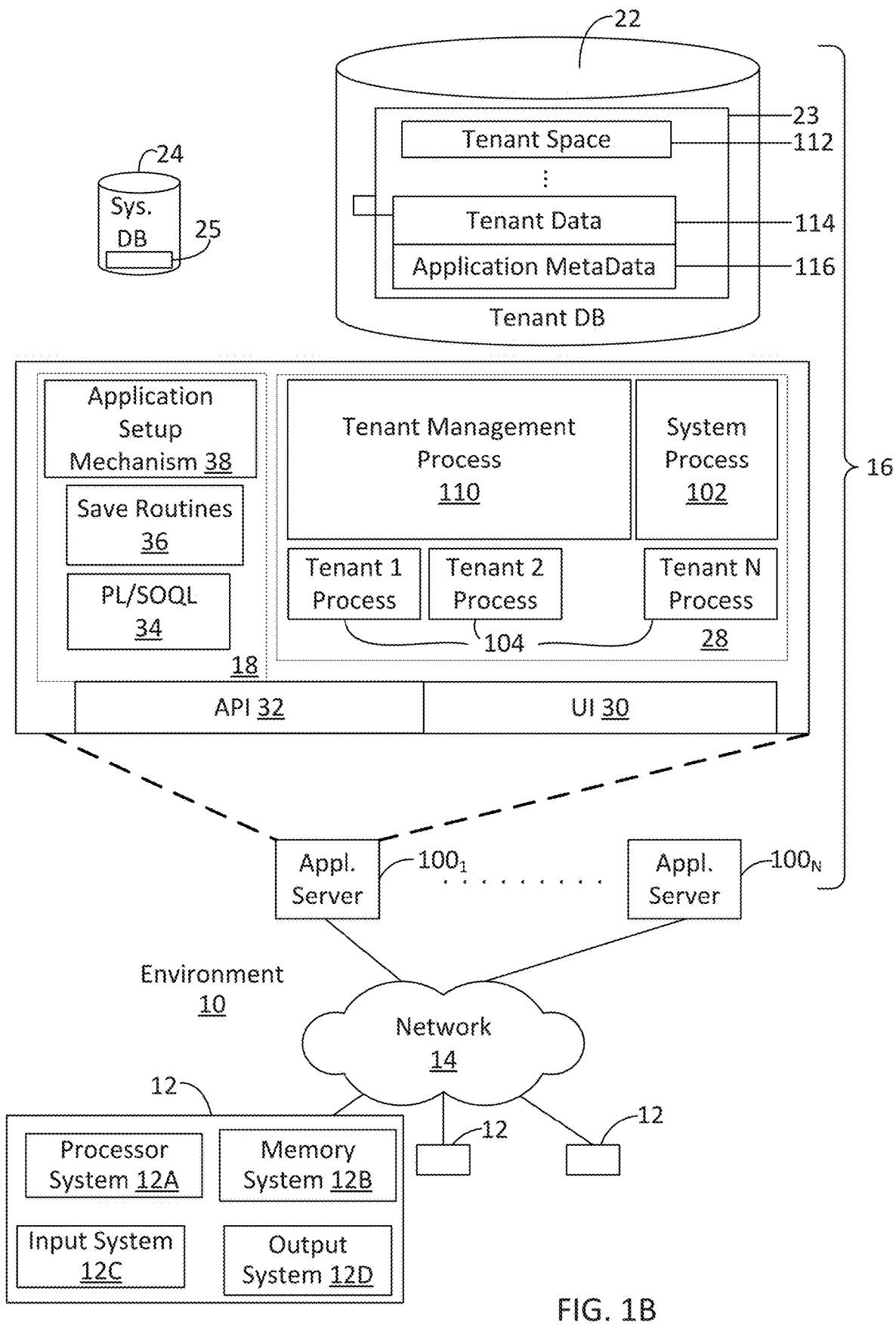
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers 100₁-100N. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server 1001 can be coupled via the network 14 (for example, the Internet), another application server 100N-1 can be coupled via a direct network link, and another application server 100N can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
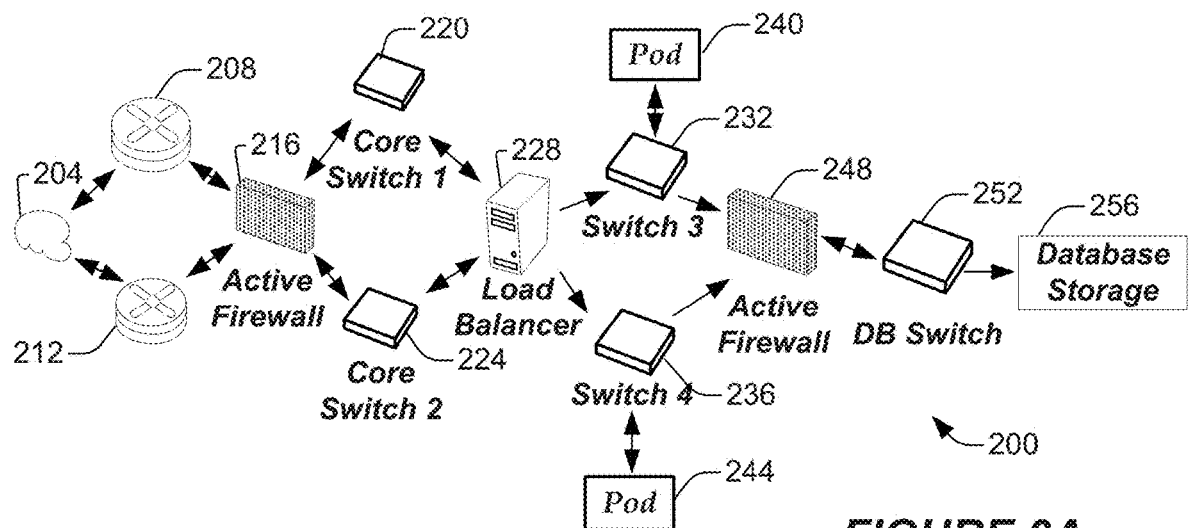
FIG. 2A shows a system diagram illustrating example architectural components of an on-demand database service environment 200 according to some implementations.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
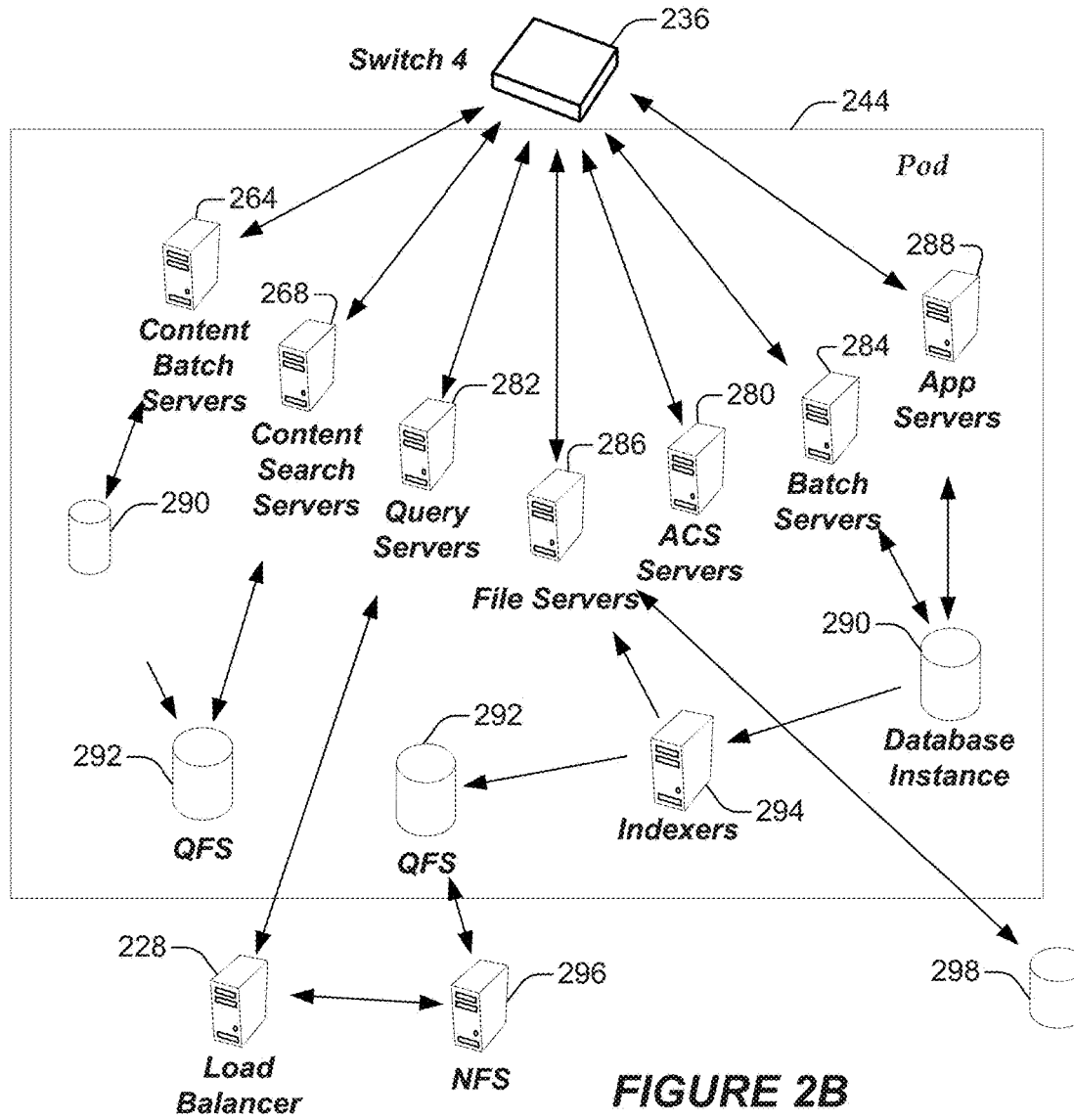
FIG. 2B shows a system diagram further illustrating example architectural components of an on-demand database service environment according to some implementations.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to several devices of each type. Also, the on-demand database service environment need not include each device shown in FIGS. 2A and 2B, or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 204 is intended to refer to a data network or multiple data networks, often including the Internet. Client machines communicably connected with the cloud 204 can communicate with other components of the on-demand database service environment 200 to access services provided by the on-demand database service environment. For example, client machines can access the on-demand database service environment to retrieve, store, edit, or process information. In some implementations, the edge routers 208 and 212 route packets between the cloud 204 and other components of the on-demand database service environment 200. For example, the edge routers 208 and 212 can employ the Border Gateway Protocol (BGP). The BGP is the core routing protocol of the Internet. The edge routers 208 and 212 can maintain a table of IP networks or 'prefixes', which designate network reachability among autonomous systems on the Internet.

In some implementations, the firewall 216 can protect the inner components of the on-demand database service environment 200 from Internet traffic. The firewall 216 can block, permit, or deny access to the inner components of the on-demand database service environment 200 based upon a set of rules and other criteria. The firewall 216 can act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 can be configured as network bridges that quickly route data between different components within the on-demand database service environment. In some implementations, the use of two or more core switches 220 and 224 can provide redundancy or reduced latency.

In some implementations, the pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 can facilitate communication between the pods 240 and 244 and client machines communicably connected with the cloud 204, for example via core switches 220 and 224. Also, the pod switches 232 and 236 may facilitate communication between the pods 240 and 244 and the database storage 256. In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the database storage 256 is guarded by a database firewall 248. The database firewall 248 can act as a computer application firewall operating at the database application layer of a protocol stack. The database firewall 248 can protect the database storage 256 from application attacks such as structure query language (SQL) injection, database rootkits, and unauthorized information disclosure. In some implementations, the database firewall 248 includes a host using one or more forms of reverse proxy services to proxy traffic before passing it to a gateway router. The database firewall 248 can inspect the contents of database traffic and block certain content or database requests. The database firewall 248 can work on the SQL application level atop the TCP/IP stack, managing applications' connection to the database or SQL management interfaces as well as intercepting and enforcing packets traveling to or from a database network or application interface.

In some implementations, communication with the database storage 256 is conducted via the database switch 252. The multi-tenant database storage 256 can include more than one hardware or software components for handling database queries. Accordingly, the database switch 252 can direct database queries transmitted by other components of the on-demand database service environment (for example, the pods 240 and 244) to the correct components within the database storage 256. In some implementations, the database storage 256 is an on-demand database system shared by many different organizations as described above with reference to FIGS. 1A and 1B.

FIG. 2B shows a system diagram further illustrating example architectural components of an on-demand database service environment according to some implementations. The pod 244 can be used to render services to a user of the on-demand database service environment 200. In some implementations, each pod includes a variety of servers or other systems. The pod 244 includes one or more content batch servers 264, content search servers 268, query servers 282, file force servers 286, access control system (ACS) servers 280, batch servers 284, and app servers 288. The pod 244 also can include database instances 290, quick file systems (QFS) 292, and indexers 294. In some implementations, some or all communication between the servers in the pod 244 can be transmitted via the switch 236.

In some implementations, the app servers 288 include a hardware or software framework dedicated to the execution of procedures (for example, programs, routines, scripts) for supporting the construction of applications provided by the on-demand database service environment 200 via the pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

The content batch servers 264 can handle requests internal to the pod. Some such requests can be long-running or not tied to a particular customer. For example, the content batch servers 264 can handle requests related to log mining, cleanup work, and maintenance tasks. The content search servers 268 can provide query and indexer functions. For example, the functions provided by the content search servers 268 can allow users to search through content stored in the on-demand database service environment. The file force servers 286 can manage requests for information stored in the Fileforce storage 298. The Fileforce storage 298 can store information such as documents, images, and basic large objects (BLOBs). By managing requests for information using the file force servers 286, the image footprint on the database can be reduced. The query servers 282 can be used to retrieve information from one or more file systems. For example, the query system 282 can receive requests for information from the app servers 288 and transmit information queries to the NFS 296 located outside the pod.

The pod 244 can share a database instance 290 configured as a multi-tenant environment in which different organizations share access to the same database. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 can transmit instructions to other servers, such as the app servers 288, to trigger the batch jobs.

In some implementations, the QFS 292 is an open source file system available from Sun Microsystems® of Santa Clara, Calif. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the network file systems 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed. In some implementations, queries from the query servers 282 are transmitted to the NFS 296 via the load balancer 228, which can distribute resource requests over various resources available in the on-demand database service environment. The NFS 296 also can communicate with the QFS 292 to update the information stored on the NFS 296 or to provide information to the QFS 292 for use by servers located within the pod 244.

In some implementations, the pod includes one or more database instances 290. The database instance 290 can transmit information to the QFS 292. When information is transmitted to the QFS, it can be available for use by servers within the pod 244 without using an additional database call. In some implementations, database information is transmitted to the indexer 294. Indexer 294 can provide an index of information available in the database 290 or QFS 292. The index information can be provided to file force servers 286 or the QFS 292.

II. Enterprise Social Networking

As initially described above, in some implementations, some of the methods, processes, devices and systems described herein can implement, or be used in the context of, enterprise social networking. Some online enterprise social networks can be implemented in various settings, including businesses, organizations and other enterprises (all of which are used interchangeably herein). For instance, an online enterprise social network can be implemented to connect users within a business corporation, partnership or organization, or a group of users within such an enterprise. For instance, Chatter® can be used by users who are employees in a business organization to share data, communicate, and collaborate with each other for various enterprise-related purposes. Some of the disclosed methods, processes, devices, systems and computer-readable storage media described herein can be configured or designed for use in a multi-tenant database environment, such as described above with respect to system 16. In an example implementation, each organization or a group within the organization can be a respective tenant of the system.

In some implementations, each user of the database system 16 is associated with a "user profile." A user profile refers generally to a collection of data about a given user. The data can include general information, such as a name, a title, a phone number, a photo, a biographical summary, or a status (for example, text describing what the user is currently doing, thinking or expressing). As described below, the data can include messages created by other users. In implementations in which there are multiple tenants, a user is typically associated with a particular tenant (or "organization"). For example, a user could be a salesperson of an organization that is a tenant of the database system 16.

A "group" generally refers to a collection of users within an organization. In some implementations, a group can be defined as users with the same or a similar attribute, or by membership or subscription. Groups can have various visibilities to users within an enterprise social network. For example, some groups can be private while others can be public. In some implementations, to become a member within a private group, and to have the capability to publish and view feed items on the group's group feed, a user must request to be subscribed to the group (and be accepted by, for example, an administrator or owner of the group), be invited to subscribe to the group (and accept), or be directly subscribed to the group (for example, by an administrator or owner of the group). In some implementations, any user within the enterprise social network can subscribe to or follow a public group (and thus become a "member" of the public group) within the enterprise social network.

A "record" generally refers to a data entity, such as an instance of a data object created by a user or group of users of the database system 16. Such records can include, for example, data objects representing and maintaining data for accounts, cases, opportunities, leads, files, documents, orders, pricebooks, products, solutions, reports and forecasts, among other possibilities. For example, a record can be for a business partner or potential business partner (for example, a client, vendor, distributor, etc.) of a user or a user's organization, and can include information describing an entire enterprise, subsidiaries of an enterprise, or contacts at the enterprise. As another example, a record can be a project that a user or group of users is/are working on, such as an opportunity (for example, a possible sale) with an existing partner, or a project that the user is trying to obtain. A record has data fields that are defined by the structure of the object (for example, fields of certain data types and purposes). A record also can have custom fields defined by a user or organization. A field can include (or include a link to) another record, thereby providing a parent-child relationship between the records.

Records also can have various visibilities to users within an enterprise social network. For example, some records can be private while others can be public. In some implementations, to access a private record, and to have the capability to publish and view feed items on the record's record feed, a user must request to be subscribed to the record (and be accepted by, for example, an administrator or owner of the record), be invited to subscribe to the record (and accept), be directly subscribed to the record or be shared the record (for example, by an administrator or owner of the record). In some implementations, any user within the enterprise social network can subscribe to or follow a public record within the enterprise social network.

In some online enterprise social networks, users also can follow one another by establishing "links" or "connections" with each other, sometimes referred to as "friending" one another. By establishing such a link, one user can see information generated by, generated about, or otherwise associated with another user. For instance, a first user can see information posted by a second user to the second user's profile page. In one example, when the first user is following the second user, the first user's news feed can receive a post from the second user submitted to the second user's profile feed.

In some implementations, users can access one or more enterprise network feeds (also referred to herein simply as "feeds"), which include publications presented as feed items or entries in the feed. A network feed can be displayed in a graphical user interface (GUI) on a display device such as the display of a user's computing device as described above. The publications can include various enterprise social network information or data from various sources and can be stored in the database system 16, for example, in tenant database 22. In some implementations, feed items of information for or about a user can be presented in a respective user feed, feed items of information for or about a group can be presented in a respective group feed, and feed items of information for or about a record can be presented in a respective record feed. A second user following a first user, a first group, or a first record can automatically receive the feed items associated with the first user, the first group or the first record for display in the second user's news feed. In some implementations, a user feed also can display feed items from the group feeds of the groups the respective user subscribes to, as well as feed items from the record feeds of the records the respective user subscribes to.

The term "feed item" (or feed element) refers to an item of information, which can be viewable in a feed. Feed items can include publications such as messages (for example, user-generated textual posts or comments), files (for example, documents, audio data, image data, video data or other data), and "feed-tracked" updates associated with a user, a group or a record (feed-tracked updates are described in greater detail below). A feed item, and a feed in general, can include combinations of messages, files and feed-tracked updates. Documents and other files can be included in, linked with, or attached to a post or comment. For example, a post can include textual statements in combination with a document. The feed items can be organized in chronological order or another suitable or desirable order (which can be customizable by a user) when the associated feed is displayed in a graphical user interface (GUI), for instance, on the user's computing device.

Messages such as posts can include alpha-numeric or other character-based user inputs such as words, phrases, statements, questions, emotional expressions, or symbols. In some implementations, a comment can be made on any feed item. In some implementations, comments are organized as a list explicitly tied to a particular feed item such as a feed-tracked update, post, or status update. In some implementations, comments may not be listed in the first layer (in a hierarchal sense) of feed items, but listed as a second layer branching from a particular first layer feed item. In some implementations, a "like" or "dislike" also can be submitted in response to a particular post, comment or other publication.

A "feed-tracked update," also referred to herein as a "feed update," is another type of publication that may be presented as a feed item and generally refers to data representing an event. A feed-tracked update can include text generated by the database system in response to the event, to be provided as one or more feed items for possible inclusion in one or more feeds. In one implementation, the data can initially be stored by the database system in, for example, tenant database 22, and subsequently used by the database system to create text for describing the event. Both the data and the text can be a feed-tracked update, as used herein. In some implementations, an event can be an update of a record and can be triggered by a specific action by a user. Which actions trigger an event can be configurable. Which events have feed-tracked updates created and which feed updates are sent to which users also can be configurable. Messages and feed updates can be stored as a field or child object of a record. For example, the feed can be stored as a child object of the record.

As described above, a network feed can be specific to an individual user of an online social network. For instance, a user news feed (or "user feed") generally refers to an aggregation of feed items generated for a particular user, and in some implementations, is viewable only to the respective user on a home page of the user. In some implementations a user profile feed (also referred to as a "user feed") is another type of user feed that refers to an aggregation of feed items generated by or for a particular user, and in some implementations, is viewable only by the respective user and other users following the user on a profile page of the user. As a more specific example, the feed items in a user profile feed can include posts and comments that other users make about or send to the particular user, and status updates made by the particular user. As another example, the feed items in a user profile feed can include posts made by the particular user and feed-tracked updates initiated based on actions of the particular user.

As is also described above, a network feed can be specific to a group of enterprise users of an online enterprise social network. For instance, a group news feed (or "group feed") generally refers to an aggregation of feed items generated for or about a particular group of users of the database system 16 and can be viewable by users following or subscribed to the group on a profile page of the group. For example, such feed items can include posts made by members of the group or feed-tracked updates about changes to the respective group (or changes to documents or other files shared with the group). Members of the group can view and post to a group feed in accordance with a permissions configuration for the feed and the group. Publications in a group context can include documents, posts, or comments. In some implementations, the group feed also includes publications and other feed items that are about the group as a whole, the group's purpose, the group's description, a status of the group, and group records and other objects stored in association with the group. Threads of publications including updates and messages, such as posts, comments, likes, etc., can define conversations and change over time. The following of a group allows a user to collaborate with other users in the group, for example, on a record or on documents or other files (which may be associated with a record).

As is also described above, a network feed can be specific to a record in an online enterprise social network. For instance, a record news feed (or "record feed") generally refers to an aggregation of feed items about a particular record in the database system 16 and can be viewable by users subscribed to the record on a profile page of the record. For example, such feed items can include posts made by users about the record or feed-tracked updates about changes to the respective record (or changes to documents or other files associated with the record). Subscribers to the record can view and post to a record feed in accordance with a permissions configuration for the feed and the record. Publications in a record context also can include documents, posts, or comments. In some implementations, the record feed also includes publications and other feed items that are about the record as a whole, the record's purpose, the record's description, and other records or other objects stored in association with the record. Threads of publications including updates and messages, such as posts, comments, likes, etc., can define conversations and change over time. The following of a record allows a user to track the progress of that record and collaborate with other users subscribing to the record, for example, on the record or on documents or other files associated with the record.

In some implementations, data is stored in database system 16, including tenant database 22, in the form of "entity objects" (also referred to herein simply as "entities"). In some implementations, entities are categorized into "Records objects" and "Collaboration objects." In some such implementations, the Records object includes all records in the enterprise social network. Each record can be considered a sub-object of the overarching Records object. In some implementations, Collaboration objects include, for example, a "Users object," a "Groups object," a "Group-User relationship object," a "Record-User relationship object" and a "Feed Items object."

In some implementations, the Users object is a data structure that can be represented or conceptualized as a "Users Table" that associates users to information about or pertaining to the respective users including, for example, metadata about the users. In some implementations, the Users Table includes all of the users within an organization. In some other implementations, there can be a Users Table for each division, department, team or other sub-organization within an organization. In implementations in which the organization is a tenant of a multi-tenant enterprise social network platform, the Users Table can include all of the users within all of the organizations that are tenants of the multi-tenant enterprise social network platform. In some implementations, each user can be identified by a user identifier ("UserID") that is unique at least within the user's respective organization. In some such implementations, each organization also has a unique organization identifier ("OrgID").

In some implementations, the Groups object is a data structure that can be represented or conceptualized as a "Groups Table" that associates groups to information about or pertaining to the respective groups including, for example, metadata about the groups. In some implementations, the Groups Table includes all of the groups within the organization. In some other implementations, there can be a Groups Table for each division, department, team or other sub-organization within an organization. In implementations in which the organization is a tenant of a multi-tenant enterprise social network platform, the Groups Table can include all of the groups within all of the organizations that are tenants of the multitenant enterprise social network platform. In some implementations, each group can be identified by a group identifier ("GroupID") that is unique at least within the respective organization.

In some implementations, the database system 16 includes a "Group-User relationship object." The Group-User relationship object is a data structure that can be represented or conceptualized as a "Group-User Table" that associates groups to users subscribed to the respective groups. In some implementations, the Group-User Table includes all of the groups within the organization. In some other implementations, there can be a Group-User Table for each division, department, team or other sub-organization within an organization. In implementations in which the organization is a tenant of a multi-tenant enterprise social network platform, the Group-User Table can include all of the groups within all of the organizations that are tenants of the multitenant enterprise social network platform.

In some implementations, the Records object is a data structure that can be represented or conceptualized as a "Records Table" that associates records to information about or pertaining to the respective records including, for example, metadata about the records. In some implementations, the Records Table includes all of the records within the organization. In some other implementations, there can be a Records Table for each division, department, team or other sub-organization within an organization. In implementations in which the organization is a tenant of a multi-tenant enterprise social network platform, the Records Table can include all of the records within all of the organizations that are tenants of the multitenant enterprise social network platform. In some implementations, each record can be identified by a record identifier ("Record ID") that is unique at least within the respective organization.

In some implementations, the database system 16 includes a "Record-User relationship object." The Record-User relationship object is a data structure that can be represented or conceptualized as a "Record-User Table" that associates records to users subscribed to the respective records. In some implementations, the Record-User Table includes all of the records within the organization. In some other implementations, there can be a Record-User Table for each division, department, team or other sub-organization within an organization. In implementations in which the organization is a tenant of a multi-tenant enterprise social network platform, the Record-User Table can include all of the records within all of the organizations that are tenants of the multitenant enterprise social network platform.

In some implementations, the database system 16 includes a "Feed Items object." The Feed items object is a data structure that can be represented or conceptualized as a "Feed Items Table" that associates users, records and groups to posts, comments, documents or other publications to be displayed as feed items in the respective user feeds, record feeds and group feeds, respectively. In some implementations, the Feed Items Table includes all of the feed items within the organization. In some other implementations, there can be a Feed Items Table for each division, department, team or other sub-organization within an organization. In implementations in which the organization is a tenant of a multi-tenant enterprise social network platform, the Feed Items Table can include all of the feed items within all of the organizations that are tenants of the multitenant enterprise social network platform.

Enterprise social network news feeds are different from typical consumer-facing social network news feeds (for example, FACEBOOK®) in many ways, including in the way they prioritize information. In consumer-facing social networks, the focus is generally on helping the social network users find information that they are personally interested in. But in enterprise social networks, it can, in some instances, applications, or implementations, be desirable from an enterprise's perspective to only distribute relevant enterprise-related information to users and to limit the distribution of irrelevant information. In some implementations, relevant enterprise-related information refers to information that would be predicted or expected to benefit the enterprise by virtue of the recipients knowing the information, such as an update to a database record maintained by or on behalf of the enterprise. Thus, the meaning of relevance differs significantly in the context of a consumer-facing social network as compared with an employee-facing or organization member-facing enterprise social network.

In some implementations, when data such as posts or comments from one or more enterprise users are submitted to a network feed for a particular user, group, record or other object within an online enterprise social network, an email notification or other type of network communication may be transmitted to all users following the respective user, group, record or object in addition to the inclusion of the data as a feed item in one or more user, group, record or other feeds. In some online enterprise social networks, the occurrence of such a notification is limited to the first instance of a published input, which may form part of a larger conversation. For instance, a notification may be transmitted for an initial post, but not for comments on the post. In some other implementations, a separate notification is transmitted for each such publication, such as a comment on a post.

In embodiments, a community webpage, such as, for example, one displayed in the Salesforce.com Community Cloud, may leverage content already available, such that the provider of the webpage would not need to develop equivalent content in the community, thus leveraging existing know how. It is noted that, as used herein, the term "community" may refer to any hosted social platform. It is further noted that several of the examples will refer to the Salesforce Community Cloud, which is a well known example of a community that is designed to connect and facilitate communication among an organization's employees, partners and customers. In embodiments, this feature allows customers to easily maintain a consistent brand across all of their portals, in what is commonly known as "build once, deploy everywhere."

It is here noted that in what follows, for ease of description, exemplary systems, methods, computer programs or web page components that may implement embodiments of the invention may be referred to as "CMS Connect", or "a CMS Connect component", which refer to technology for connecting a community webpage to an external content management system, as described more fully below.

In embodiments, a method of securely inserting portions of HTML pages maintained on external web servers into an online community web page may be provided. In embodiments, the method may include requesting a web page maintained by a social platform, the web page including embedded settings referring to content on a remote server, and retrieving, based at least in part on the embedded settings, content from the remote server including, for example: one or more of page level Cascading Style Sheets ("CSS"), JavaScript, or HTML fragments. The method may further include processing the retrieved content in a secured environment according to one or more security protocols, and rendering the web page using the processed retrieved content.

In embodiments content from a remote server may be securely imported or injected into an organization's web page maintained in the community. In embodiments, the previously created content may be stored on one of the organization's remote servers, such as, for example, a server that supports one or more of its public facing web sites. In embodiments, a computer program may be stored on a storage medium for securely inserting portions of content maintained on external web servers into an online community web page. The computer program may comprise a set of instructions operable to cause a computer to receive a request to render a web page maintained within a social platform, the web page including embedded settings that refer to content on one or more remote servers. The computer program may further cause the computer to retrieve, at a rendering time of the web page, based at least in part on the embedded settings, content from the one or more remote servers, process the retrieved content in a secured environment according to one or more security protocols and insert it into the web page. In embodiments, the computer program may further cause the computer to render the web page in a main window and the processed retrieved content in an isolated custom window, although to a viewer, the rendered web page is seen as a single seamless whole, as described and illustrated below.

Thus, in embodiments, isolation of external content in a web page may be achieved. In embodiments, content from an external system may be retrieved in a secured environment which prevents it from reading other components' rendered data without restriction, thereby preventing it from causing, for example, Cross-Site Scripting (XSS) attacks, or similar security issues. In embodiments, external content brought to a web page through a CMS Connect component may run in a separate namespace, which may be termed "user mode." Instead of having access to the real document. Document Object Model ("DOM"), or real "window" objects, this external content receives a custom DOM, (e.g., a "secure-DOM", such as secure DOM 755 of FIG. 7) custom window (e.g., a "secure window", such as secure window 753 of FIG. 7) such that it cannot access other components' DOM that are in different namespace.

In embodiments, "Use strict" and Content Security Policy (CSP) may be enabled and enforced for security of content, such as, for example, where a locker service (described below) implicitly enables JavaScript ES5 strict mode.

In embodiments, for CMS Connect HTML, display fonts defined in external CMS systems may be loaded the way they are defined in their respective systems. In some embodiments, only Cascading Style Sheets (CSS) may be scoped based on a Scope Name defined in CMS Connect setup.

However, it is noted, there are security concerns with wholesale importation of pre-existing content into a community web page. Imported code may have been hacked, such that upon execution on the community web page erroneous or malicious code may be executed. Additionally, for example, an organization may not want the members of its community to be able to see where the imported content is coming from. Thus, in embodiments, the existence and characteristic of a remote server may be hidden. In embodiments, this may be done using a proxy that may hide the remote server behind a servlet. For the visitor of a community page, all remote content is funneled through the CMS Connect servlet which appears as a proxy.

Additionally, in embodiments, external JavaScript may be evaluated in a secure environment to prevent execution of erroneous or malicious code, and external HTML may be sanitized to prevent injection of external JavaScript from outside of the secure environment.

Figure 3:
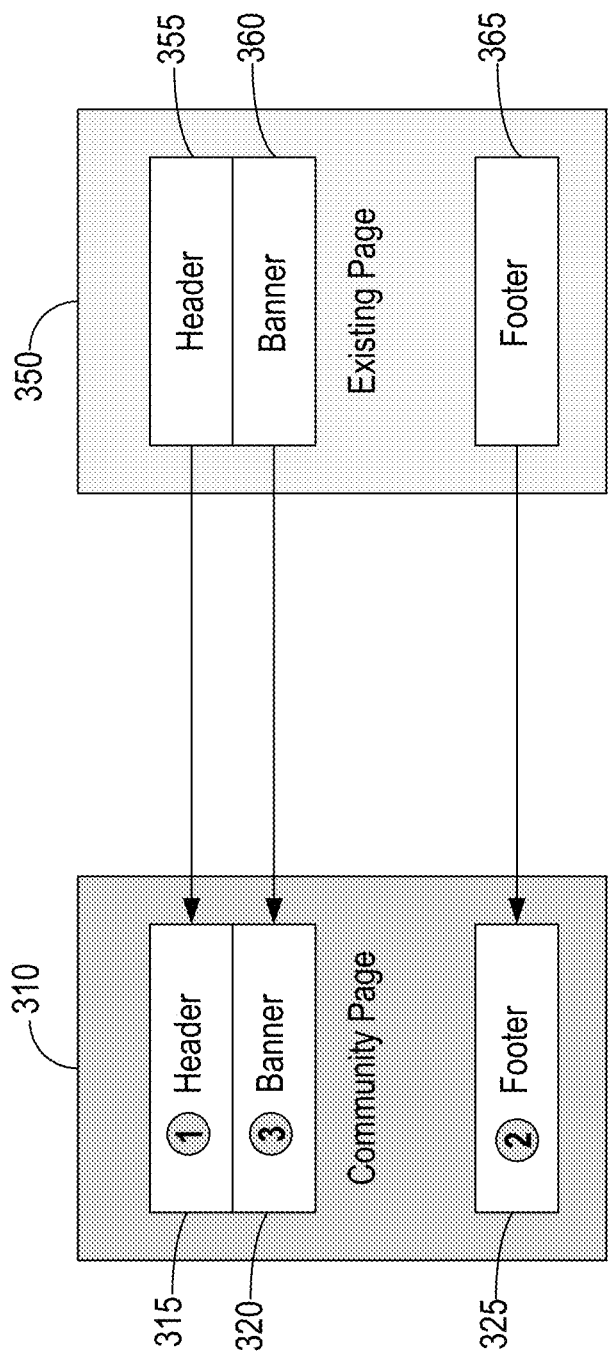
FIG. 3 illustrates secure insertion of portions of HTML pages rendered by external web servers into an example community webpage according to some implementations.

FIG. 3 illustrates exemplary page fragments that may be retrieved from a remote server in accordance with some implementations. With reference to FIG. 3, insertion of portions of HTML pages rendered by external web servers into an example community webpage is illustrated. In embodiments, a community webpage 310 may include a page header 315, a banner 320 and a page footer 325. These webpage components are rather common, and may thus already have been developed by the provider of the community page for its own public facing web pages. Thus, in embodiments, they may be retrieved from a remote server (not shown) which maintains existing web page 350. Existing web page 350 may thus already have a header 355, a banner 360, a footer 365, or other content, such as, for example carousels, blog posts, ads, a mini application such as a widget, that may display, for example, a slideshow, a map, weather information, stock charts, or a checkout and payment mini application, or the like, and this content need not be recreated within an online community by the provider of the community page, which would needlessly duplicate efforts.

Figure 4:
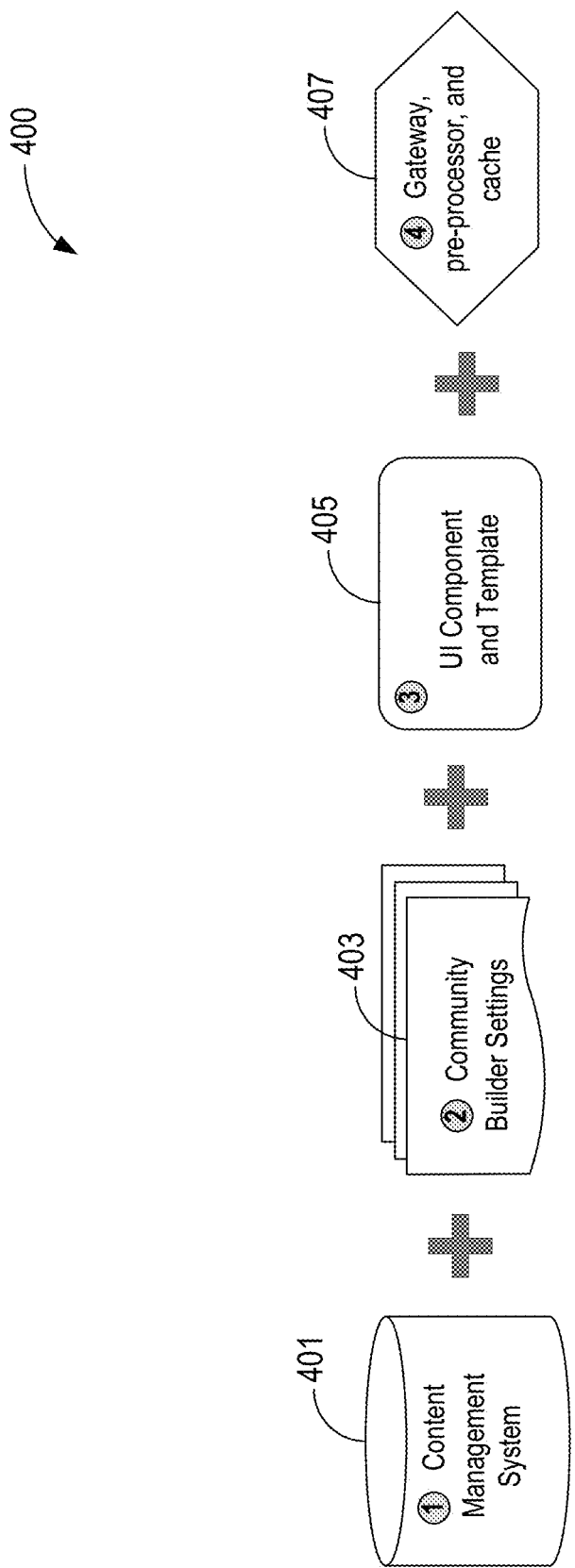
FIG. 4 illustrates example system components for securely inserting content from a remote content source into a community web page according to some implementations.

FIG. 4 illustrates example components of a system 400 for securely inserting content from a remote content source into a community web page according to some implementations. With reference to FIG. 4, in embodiments, an example system 400 may have four main components. These may include a remote Content Management System 401 acting as the content source, such as, for example, the remote server hosting existing web page 350 of FIG. 3, and a series of panels that may be stored in community builder settings 403 of the community webpage. It is here noted that in the example system shown in FIG. 1B, such settings may be stored in tenant space 112, and surface in an input 12C and output 12D setup page that may be edited by an administrator of the community and its webpage. Once properly configured, the community builder settings may not be visible to a visitor of a community web page under normal operation.

Still referring to FIG. 1B, for a visitor to a web page (or its administrator, in a preview mode), the settings may be transferred to the client, reside in memory 12B and be used by processor 12A to display various output systems 12B, and even possibly input systems 12C, depending on the content retrieved from the remote system.

Returning now to FIG. 4, an example system may further include a Community Component and Template 405 to indicate where to display the remote content in the community web page, and finally, a server 407 acting as a gateway, pre-processor and cache for the remote content. It is noted that the term Community Component 405 refers to an example embodiment of a community page hosting service, such as, for example, the Salesforce Community Cloud, and describes a user accessible tool in a community builder toolbox. Its function is to receive configuration parameters at build time, and to inject a selected HTML fragment at run time.

With reference to the circled numerals in FIG. 4 designating each element of system 400, it is noted that the four shown components of system 400 may be understood as a generalized model that includes content 1, contact/access settings 2, a view 3 and a controller 4. A more detailed system diagram, that utilizes the elements shown in FIG. 4, is next described, in connection with FIG. 4A.

Figure 4A:
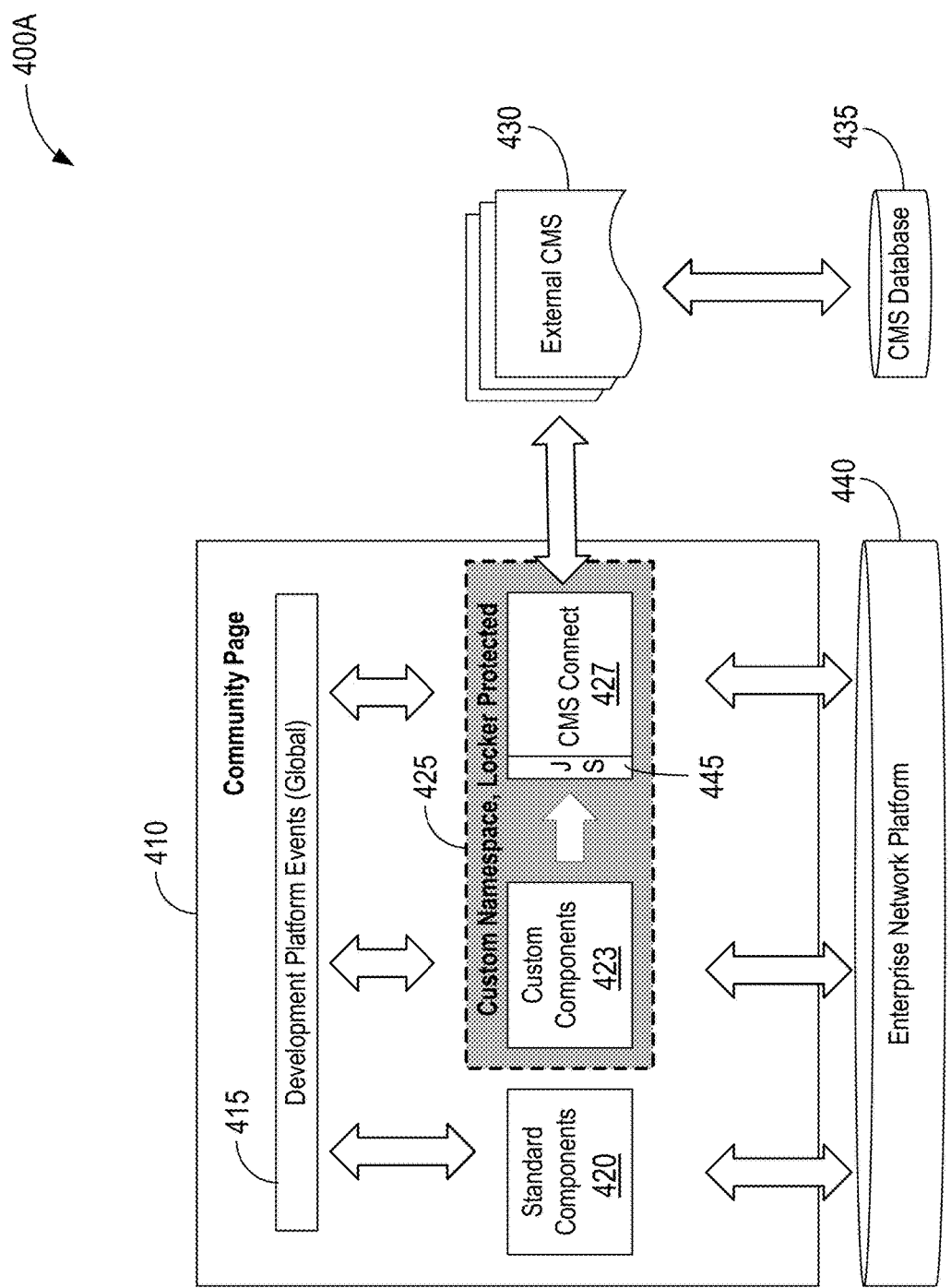
FIG. 4A illustrates an example system for securely inserting content from a remote content source into a community web page according to some implementations.

Thus, FIG. 4A illustrates an example system 400A for securely inserting content from a remote content source into a community web page according to some implementations. With reference thereto, an example community web page 410 is depicted. It may include a development platform 415, where global events for the community webpage may be specified. It may also contain standard components 420, as well as a custom namespace 425, protected by a locker feature. It is within this locker protected namespace that custom components 423, JavaScript 445 and a content management system connect (CMS Connect) feature 427 may be provided. The CMS Connect feature 427 may retrieve external content from an external content management system, such as, for example, External CMS 430, which may interact with a CMS Database 435. The interactions between CMS Connect module 427 and External CMS 430, including interactions between External CMS 430 and CMS database 435 may be of two general types, using either a server side dispatcher, or a client side dispatcher, by which a community web page, or a computing device displaying a community web page, may connect to a remote CMS. These are described in detail below in connection with FIGS. 5 and 6, respectively.

Thus, given custom namespace 425, isolation of external content in the rendered community web page may be achieved. In embodiments, the content from External CMS 430 may be retrieved in a secured environment which prevents it from reading other components' rendered data without restriction, thereby preventing it from causing, for example, XSS attacks, or similar security issues. Within custom namespace 425, which may be termed "user mode," instead of having access to the real document or real "window" object, the external content may receive a custom DOM (e.g., a "secure-DOM") custom window such that it cannot access other components' DOM that are in a different namespace, such as the remainder of community page 410 that, in FIG. 4A, surrounds custom namespace 425. Thus, a computer rendering the community web page may render internally created content within a main window 410, and the processed retrieved content in an isolated custom window 425, although to a viewer, the rendered web page is seen as a single seamless whole.

As noted above, in embodiments, "Use strict" and Content Security Policy (CSP) may be enabled and enforced for security of content, such as, for example, where a locker service (described below) implicitly enables JavaScript ES5 strict mode. Further, in embodiments, for CMS Connect HTML, display fonts defined in external CMS systems may be loaded the way they are defined in their respective systems. In some embodiments, only Cascading Style Sheets (CSS) may be scoped based on a Scope Name defined in CMS Connect setup.

Additionally, for example, an organization may not want the members of its community to be able to see where the imported content is coming from. Thus, in embodiments, as described in connection with FIG. 5, the existence and characteristic of a remote server may be hidden to a viewer of a community webpage. In embodiments, this may be done using a proxy that may hide the remote server behind a servlet. For the visitor of a community page, all remote content is funneled through the CMS Connect servlet which appears as a proxy.

Finally, as shown in the example system of FIG. 4A, community page 410 is accessible within Enterprise Network Platform 440. In embodiments, Enterprise Network Platform 440 may be the Salesforce platform maintained and provided by assignee hereof.

More generally, in embodiments, the following system features may be provided: A UI Component, which may be made available to users or customers in a communities builder interface. As noted above, its role may be to receive configuration parameters at build time, and to inject, for example, HTML fragments into the community page at run time. A Setup Page, where customers may enter various settings to retrieve content. A Script HTTP client, to retrieve the HTML requested by a Custom Component. In embodiments, the client may, for example, be written in Typescript, CoffeeScript, Java, ActionScript, etc. An asset filesystem, to store the HTML, CSS, and JavaScript required by the client. A Java HTTP client, which may retrieve the HTML, CSS, and JavaScript from the CMS. A Java HTML sanitizer, to scope and sanitize (remove unwanted tags) before storing HTML fragments in the filesystem. A CSS processor, to scope, sanitize and compress CSS before storing stylesheets in the filesystem. In embodiments, the CSS processor may be implemented, for example, in JavaScript, Scala, Groovy, C #, etc. A JavaScript Processor, to sanitize, compress, or transpile remote JS in any way required by the client. A template model, to inject HTML markup, CSS tags, and JavaScript tags, in the community template, and a Java Dispatcher, to refreshes the assets on expiration.

As noted above, in embodiments, the community web page may be rendered in a main window and the processed retrieved content in an isolated custom window. As a result, in embodiments, isolation of external content injected into the web page may be achieved. In embodiments, the retrieval of content from an external system may be done in a secured environment to prevent it from reading other components' (of the community webpage) rendered data without restriction, thereby preventing such external content from causing, for example, XSS attacks, or similar security problems. In embodiments, external content brought to a web page through a CMS Connect component may run in a separate namespace, which may be termed "user mode." Instead of having access to the real document or real "window" object, this external content receives a custom DOM (e.g., a "secure-DOM") custom window such that it cannot access other components' DOM that are in different namespace.

Moreover, in embodiments, "Use strict" and Content Security Policy (CSP) may be enabled and enforced for security of content, such as, for example, where a locker service (described below) implicitly enables JavaScript ES5 strict mode. In embodiments, for CMS Connect HTML, display fonts defined in external CMS systems may be loaded the way they are defined in their respective systems. In some embodiments, only Cascading Style Sheets (CSS) may be scoped based on a Scope Name defined in CMS Connect setup.

Figure 5:
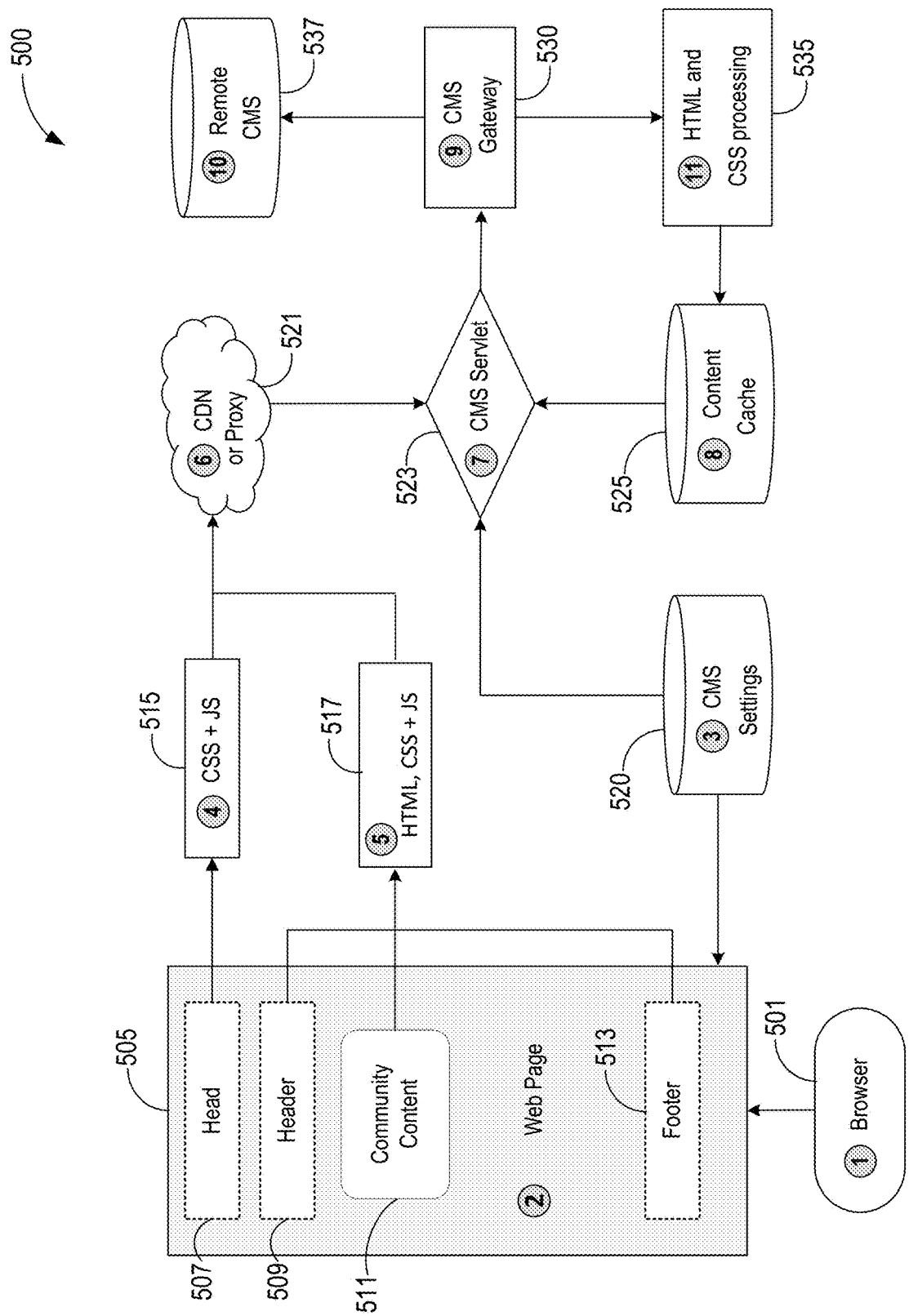
FIG. 5 illustrates an overview of the operational flow for a process to use a server dispatcher to preprocess and cache Content Management System (CMS) content, CSS and/or HTML sanitizing and scoping, according to some implementations.
Figure 6:
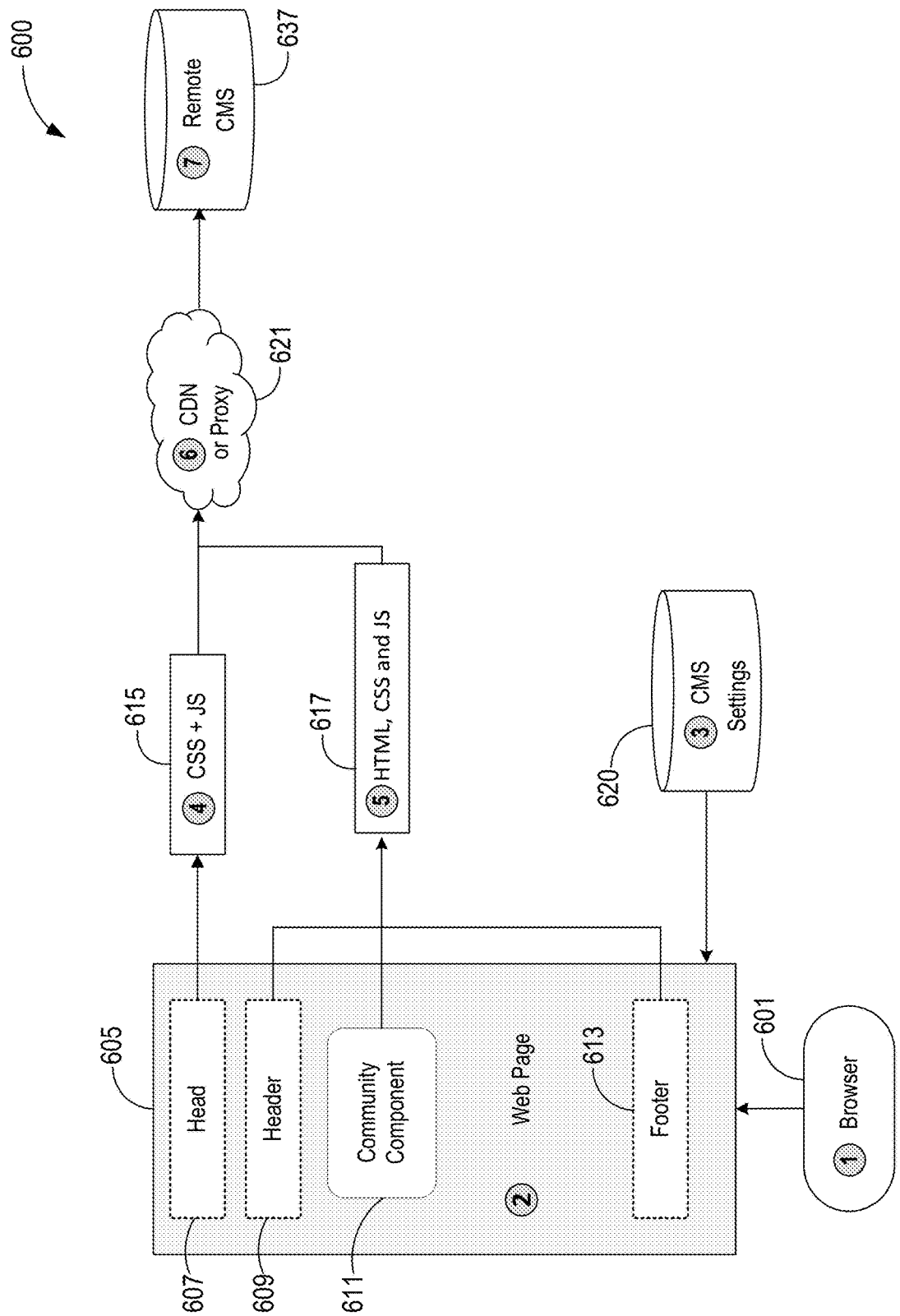
FIG. 6 illustrates an overview of the operational flow for an alternate process that uses a client dispatcher to connect to a remote CMS, according to some implementations.

FIGS. 5 and 6 respectively show alternate processes that a community web page, or a computing device displaying a community web page, may use to connect to a remote CMS, according to some implementations. FIG. 5 illustrates an overview of the operational flow for a process to use a server dispatcher to preprocess and cache Content Management System (CMS) content, CSS and/or HTML sanitizing and scoping, according to some implementations. FIG. 6 illustrates using a client dispatcher to connect to the remote CMS. These processes, with respect to FIGS. 5 and 6, are next described.

With reference to FIG. 5, an overview of the operational flow of a process 500 to use a server dispatcher to preprocess and cache Content Management System (CMS) content, according to some implementations is presented. Process 500 may be performed by a system or apparatus according to some implementations. Process 500 may include blocks 501 through 537. In alternate embodiments, process 500 may have more or less operations, and some of the operations may be performed in different order.

Process 500 may begin at block 501, where a browser may make a request to obtain a web page 505. For example, the web page may be maintained by an organization in a community, and the browser making the request may be operated by a customer, partner or member of the organization, such as, for example, an organization participating in Salesforce's Community Cloud, for example. The requested web page 505 contains content stored on remote CMS 537, for example, as part of one or more of the organization's own public facing web pages (not just viewable within the community). To access the content from remote CMS 537, web page 505 contains embedded CMS settings 520.

In embodiments, embedded CMS settings 520 allow the client-side rendering (i.e., the rendering performed in browser 501 to display in-community web page 505) to retrieve both page level CSS and JavaScript 515 as well as HTML, CSS and JS fragments 517, which contain content stored on remote CMS 537. It is noted that CSS or "Cascading Style Sheets" is a language used to describe the rendering of structured documents, e.g., HTML and XML, on screen, on paper, in speech, etc. CSS thus describes how HTML elements are to be displayed on screen, paper, or in other media.

Thus, continuing with reference to FIG. 5, Community Content 511, Header 509 and Footer 513 may all retrieve HTML, CSS and JS fragments 517. Page level CSS and JavaScript 515, and HTML, CSS and JS fragments 517, may both be cached by a Content Delivery Network (CDN) or reverse-proxy 521. It is here noted that a proxy is normally a cache near the client. For example, an office can hide the Internet behind a proxy, and reduce duplicate requests to the outside world. A reverse proxy sits near the server and may prevent duplicate identical requests from hitting the server. The expiration of the cache can be extremely short, as low as one second. In that case, if, for example, 10K requests per minute are made by various clients to the same resource, the server is at most hit 60 times per minute.

As noted above, Community Content 511, already equipped with configuration parameters, may inject HTML, CSS and JS fragments 517 into web page 505 at run time. Head 507, it is noted, normally contains all information used to render a page, but has no visual output. Any HTML sent to the Head section will not display and would be incorrect semantically. Thus, in embodiments, resources such as CSS and JS frameworks that are shared by other resources in the page, may be added to head 507. Opposite to the Head is the body of the web page. In embodiments, HTML and accidental CSS and JS may be added to the body.

Continuing with reference to FIG. 5, page level CSS and JavaScript 515, and HTML, CSS and JS fragments 517, which may be cached by CDN or reverse-proxy 521, may be so cached by a dedicated CMS servlet 523, which itself may be backed by content cache 525. Content cache 525 may, in embodiments, be updated through a CMS gateway 530, to a remote CMS 537 after HTML and CSS processing, including CSS scoping and other changes, at block 535. It is here noted that, in embodiments, external CSS may be scoped so as to prevent conflict with any styles required to display community pages.

Continuing with reference to FIG. 5, it is noted that CMS servlet 523 and CMS Settings 520 are also communicably connected. This is because CMS Settings 523 may provide to CMS Servlet 523 additional information required to connect to Remote CMS 537. Thus, when web page 505 makes a request for CMS content 515 or 517, the URL and location of the Remote CMS 537 is not part of the request. Only file name and/or directory is generally provided with a connection name and ID. Upon receiving that information, Servlet 523 may, for example, retrieve CMS settings 520 matching the name or ID, and may learn about the extra information, such as the remote server's name and potentially necessary credentials. In embodiments, the requested content may be first looked for in Content Cache 525, if the content is not in Content Cache 525, then CMS Servlet 523 may contact CMS Gateway 530, which may retrieve the remote content, using the same CMS Settings and information from (community) web page 505. In embodiments, once retrieved, the remote content may be pre-processed, stored in Content Cache 525, and returned to CMS Servlet. 523.

Thus, in sum, following the numerals within the various blocks of FIG. 5, a browser (1) makes a request to obtain a web page (2), which contains embedded CMS settings (3), which allows client-side rendering to retrieve page level CSS and JavaScript (4), as well as HTML, CSS and JS fragments (5), cached by a CDN or a reverse-proxy (6), from a dedicated CMS servlet (7) backed by a content-cache (8), which may be updated through a gateway (9), to a remote CMS (10) after HTML and CSS processing (11).

As noted above, FIG. 6 illustrates a similar process to that illustrated in FIG. 5, with the exception that rather than use the server dispatcher of FIG. 5, the process of FIG. 6 uses a client dispatcher to connect to the remote CMS. It is noted that between the two example processes, that of FIG. 6 is a simpler implementation. This is because while client-side scripting technologies produce more volatile code, they may also provide faster application deployment.

However, it is here noted that if the remote sever required authentication, or if the location of the remote sever needed to be hidden, of if there were any other concerns with performance and security, the server dispatcher process of FIG. 5 may be more favorable. For example, a remote CMS system may not be able to handle the traffic (for example, its own reverse proxy may be inefficient or absent), or might require authentication, but the credentials cannot be sent to the client for fear of exposing them. The CMS system might not be located in an area convenient for users across the world. Instead, the server dispatcher hided the remote server location, hides the credentials it uses for authentication, can improve performance due to its own caching and reverse proxy, and even CDN for publication across the world in location closer to the end-user. Additionally, it is noted, some processing may not be done effectively on a client, in particular CSS scoping, without negatively affecting page performance. Ultimately a portion of the HTML and JS on-demand processing performed on the client may be done, for example, in a pre-processor. Thus, in such embodiments, additional maintenance and development cost may be worthwhile, given a reduced local overhead.

The client dispatcher process is next described. With reference to FIG. 6, an overview of the operational flow of a process 600 to use a client dispatcher to connect to a remote CMS is illustrated. Process 600 may be performed by a system or apparatus according to some implementations. Process 600 may include blocks 601 through 637. In alternate embodiments, process 600 may have more or less operations, and some of the operations may be performed in different order.

Continuing with reference to FIG. 6, it is noted that blocks 601 through 620 of FIG. 6 are respectively essentially the same as blocks 501 through 520 of FIG. 5, described above. The description of these blocks will therefore not be repeated. The difference between process 500 of FIG. 5 and process 600 of FIG. 6 lies in how the content from Remote CMS 537 or 637 is obtained. How this occurs in the process of FIG. 6 is next described. In process 600, just as in process 500, a browser (1) makes a request to obtain a web page (2), which contains embedded CMS settings (3), which allows client-side rendering to retrieve page level CSS and JavaScript (4), as well as HTML, CSS and JS fragments (5), cached by a CDN or a reverse-proxy (6). However, in process 600 the page level CSS and JavaScript (4), as well as HTML, CSS and JS fragments (5) may alternatively be cached by a dispatcher (7) provided as part of the infrastructure of Remote CMS 637.

It is also noted that the process of FIG. 6 does not have a HTML and CSS processing module, equivalent to 535 in FIG. 5. This is because in the example embodiment of FIG. 6 there may be cm-the-fly processing done at the moment blocks 615 and 617 are inserted into web page 605. This on-the-fly processing may be considered as part of the insertion mechanism. Thus, it may be understood that there may be a "processor" or "injector" block in each of FIGS. 5 and 6 between blocks 515 and. 507, and between blocks 615 and 607 respectively, as well as in the 4-way intersections leading from web page 505 to 517 of FIG. 5, and from web page 605 to 617 of FIG. 6. In each case, this processor or "injector" is what takes the serialized content and converts it into actual objects in the page.

Figure 7:
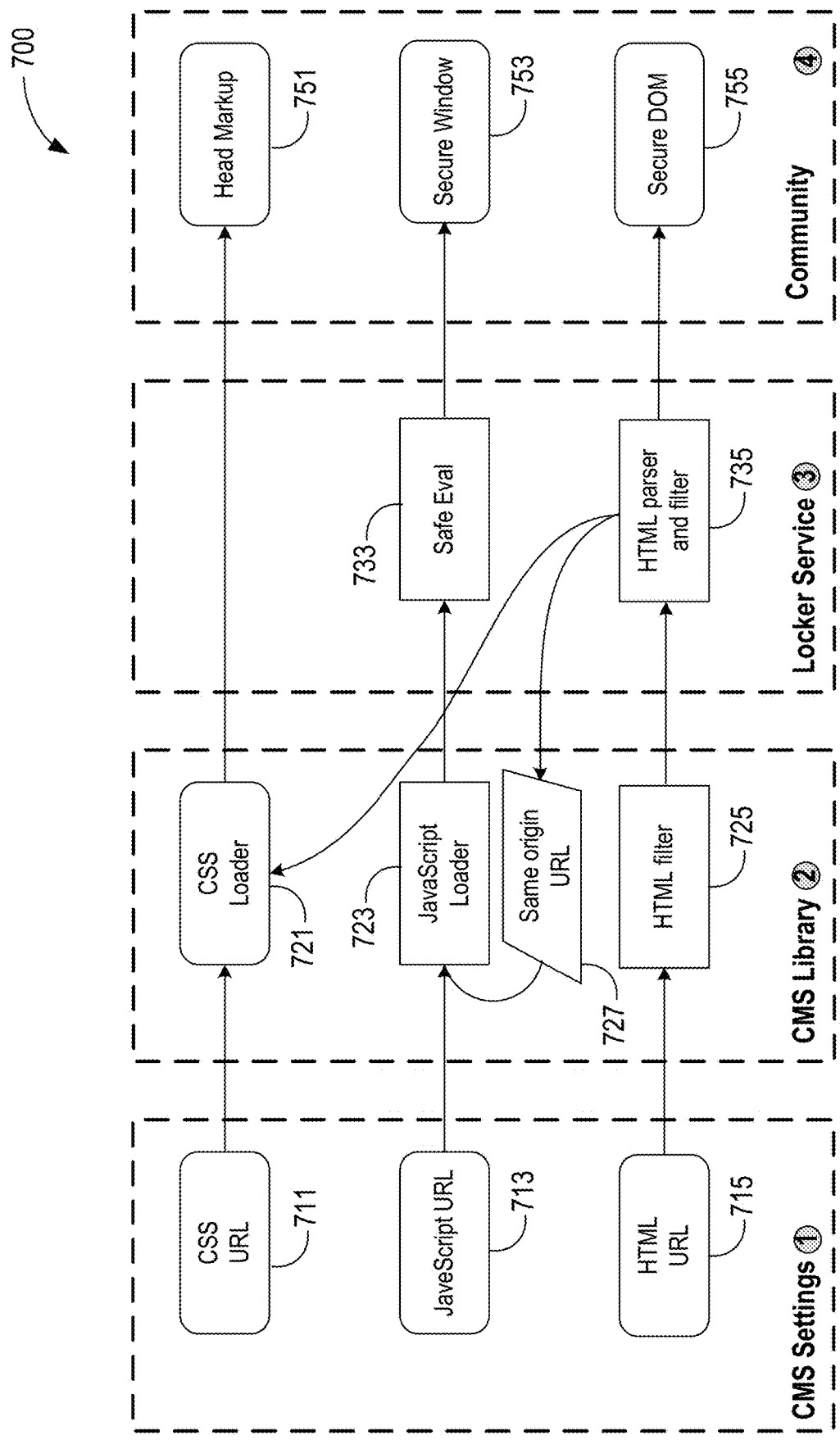
FIG. 7 illustrates how assets may be loaded by a CMS according to some implementations.
Figure 11:
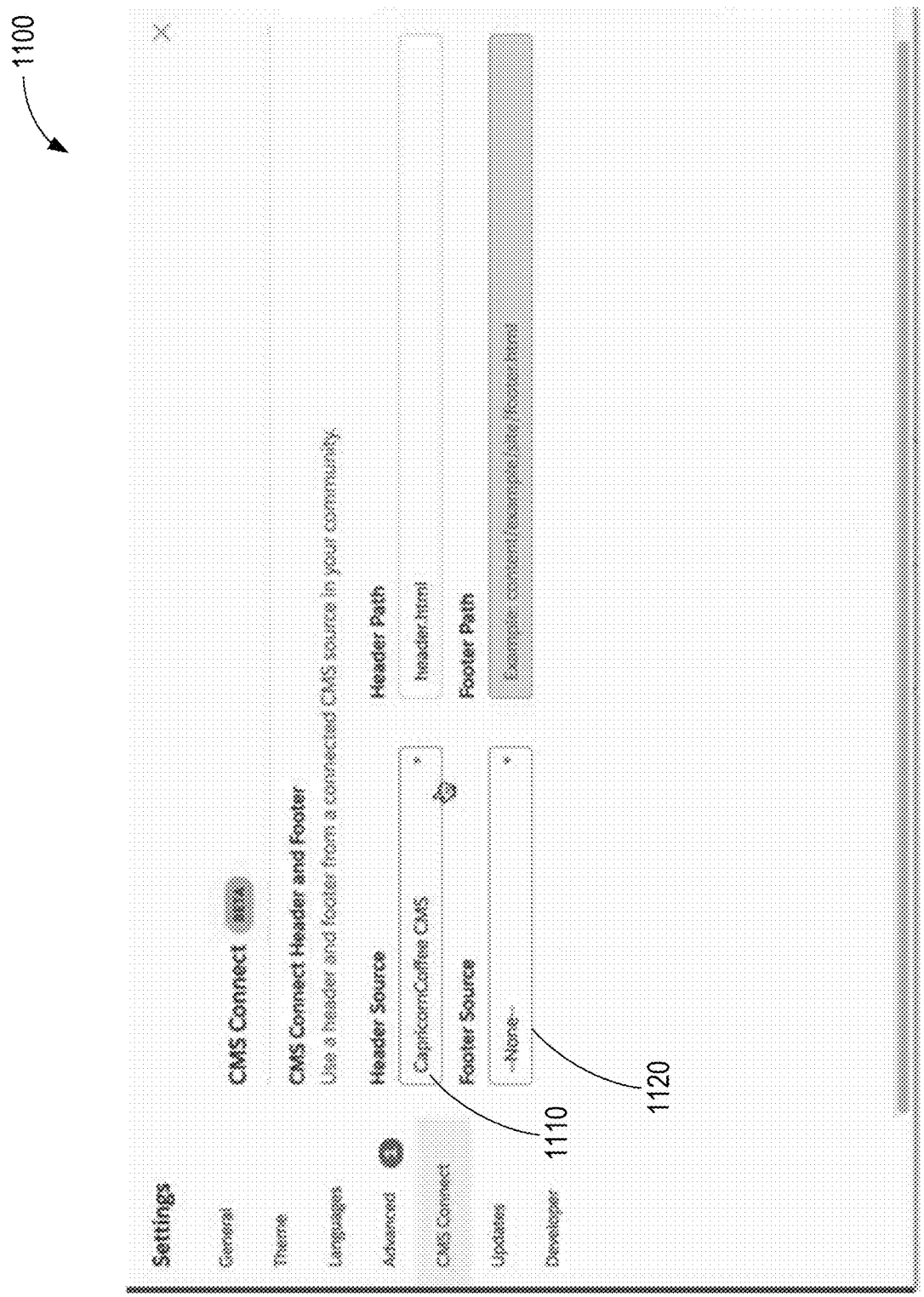
FIG. 11 illustrates an example header and footer settings screen for the example of FIGS. 9 and 10, according to some implementations.

FIG. 7 illustrates how content items, or assets, may be loaded into a web page provided or maintained within a community, in some implementations. With reference to FIG. 7, at 1 a user may define various URLs that point to resources as part of a CMS settings interface for a community page. In embodiments, a community interface for entering settings may be similar to those shown in FIGS. 11 and 12, described below. In embodiments, these settings may include a CSS URL 711, a JavaScript URL 713 and an HTML URL 715. It is noted that examples of HTML and CSS URLs are illustrated in FIG. 11, described below.

In embodiments, these URLs may, for example, be loaded by a CMS Library 2, which may include a CSS Loader 721, a JavaScript Loader 723, and an HTML filter 725. Moreover, CMS Library 2 may also load a Same origin URL 727, which may be additional JavaScript loaded following parsing of HTML, next described.

Continuing with reference to FIG. 7, Locker Service 3 may process the resources loaded by CMS Library 2. It is here noted that Locker Service 3 provides isolation of the content in the page. Each tenant receives its own environment, however, there is no content clipping as with conventional isolation techniques, making it suited to display overlays such as drop-down menus that extend beyond their confined rectangle. In embodiments, within Locker Service 3, HTML parser and filter 735 may parse and filter the HTML loaded by CMS Library 2, and may, as a result, further cause extra CSS and JavaScript to be loaded by JavaScript Loader 723 according to <script>and <link>tags. Finally, JavaScript loaded by JavaScript Loader 723 may be processed by Safe Eval 733 of Locker Service 3. Moreover, in some implementations, in order to protect against cross-site scripting, it may be required that all URLs of JavaScript files point to a trusted user-defined CMS system. Following processing by Locker Service 3, the CSS, JavaScript and HTML resources may be embedded in a community web page 4. In embodiments, for example, the community may be the Salesforce Cloud Community.

Figure 8:
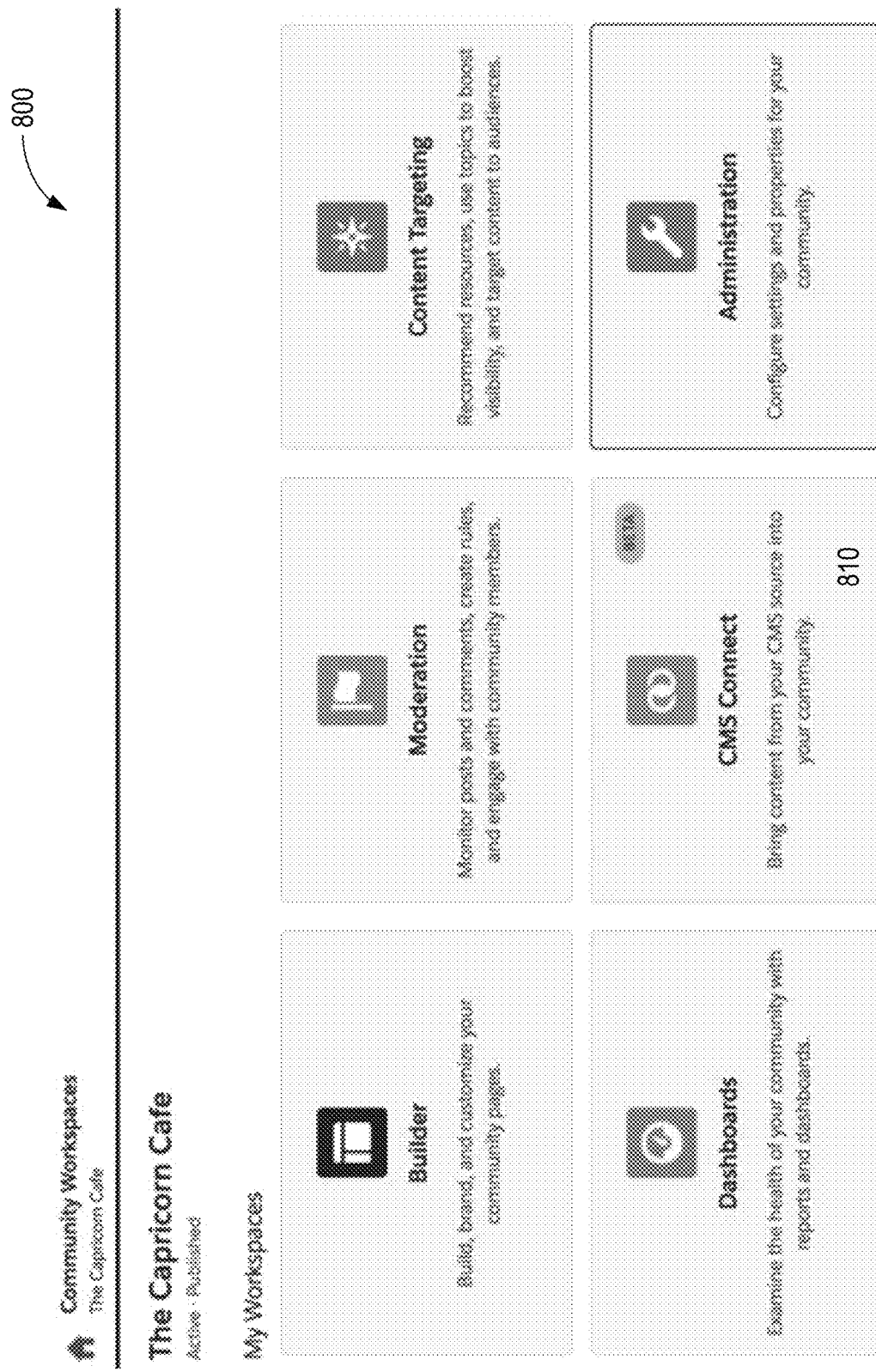
FIG. 8 illustrates a menu including a tile on an example user interface workspace screen for selecting a content importation tool according to some implementations.
Figure 9:
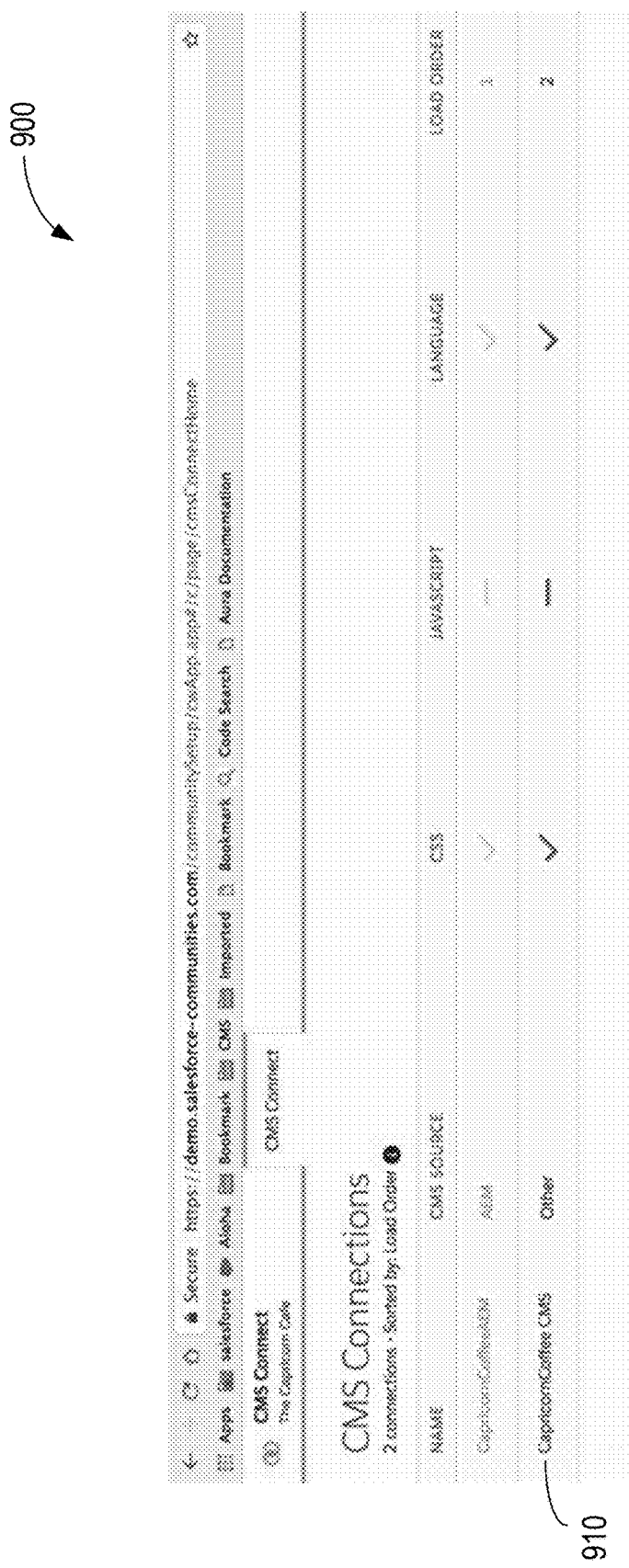
FIG. 9 illustrates an example remote connections page according to some implementations.

FIG. 8 illustrates a menu including a tile on an example user interface workspace screen for selecting a content importation tool according to some implementations. With reference thereto, a "CMS Connect" button 810 is shown. Upon a user clicking button 810 various CMS settings, such as, for example, those shown in CMS Settings 1 of FIG. 7, may be selected or set by interacting with various settings pages. One such setting page is shown in FIG. 9. With reference thereto, two CMS connections are shown, for an example organization that maintains a community web page, "The Capricorn Café." Settings for the second CMS connection shown, "CapricornCoffee CMS" 910, may be edited once it is selected. The result of that is shown in FIG. 10, next described.

Figure 10:
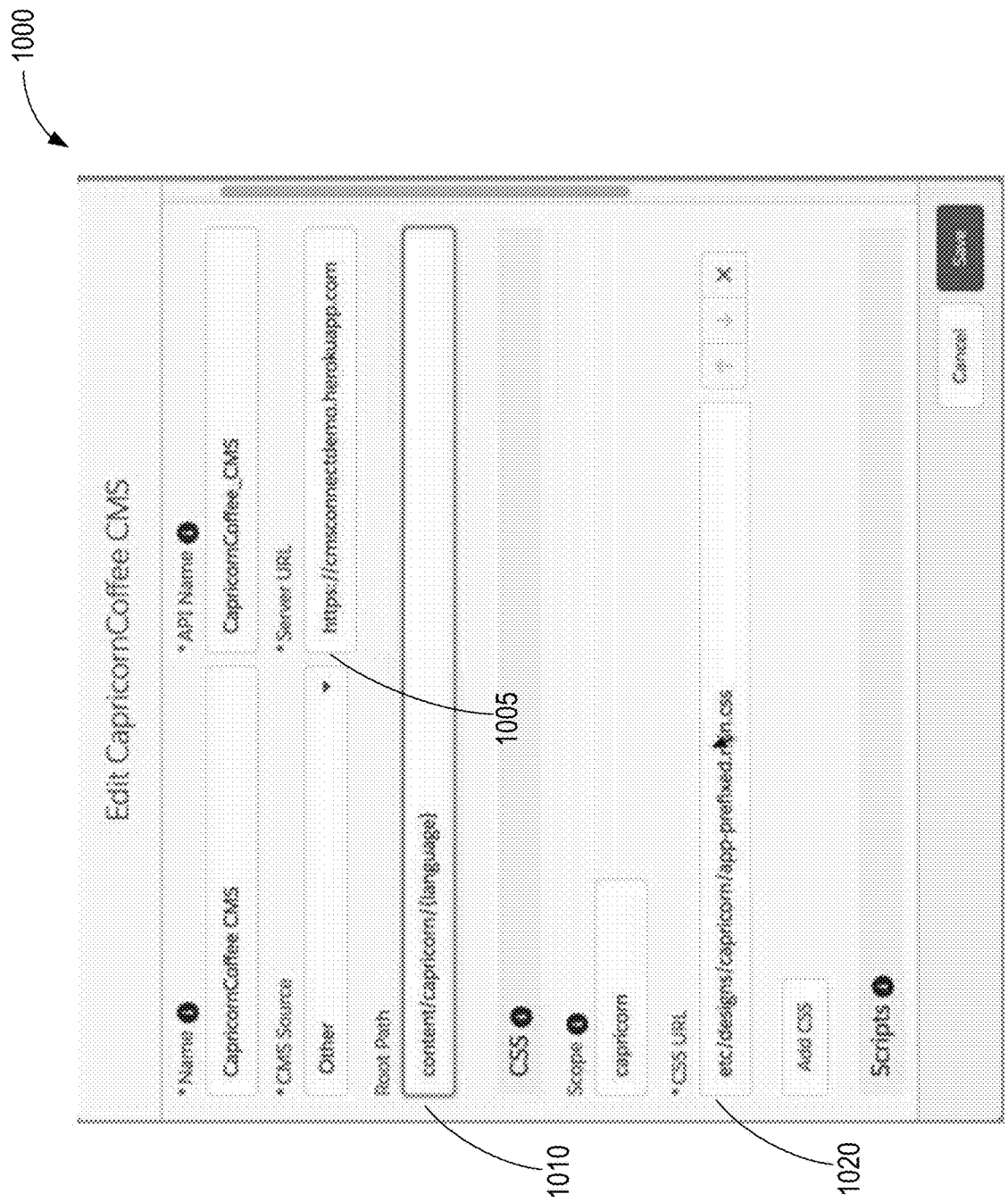
FIG. 10 illustrates details of the second entry in the example remote connections page of FIG. 9.

FIG. 10 illustrates details of the second entry in the example remote connections page of FIG. 9. With reference to FIG. 10, a user from the organization CapricornCoffee may provide a server URL 1005, a root path 1010, and a CSS URL.

FIG. 11 illustrates an example header and footer settings screen for the example embodiment of FIGS. 9 and 10, according to some implementations. With reference to FIG. 11, a user may provide a header source 1110, and a footer source 1120. In this example, there is no footer source yet provided, as shown at block 1120.

In alternate embodiments, in similar fashion as described above with reference to FIGS. 3 through 7 for CSS, JavaScript and HTML resources, JavaScript Object Notation (JSON) content may also be retrieved from an external CMS system, and presentation capabilities may be provided for delivering the content into a community web page. However, in order to support JSON as data source, an example CMS Connect platform, such as described above, may be enhanced to support dynamic content layouts in communities. Because JSON would not necessarily have content that is pre-rendered (unlike the examples described above in connection with FIGS. 3 through 7), in such embodiments it is also important to support presentation templates within communities.

Further, for alternate embodiments that support CMS Connect JSON, community branding support may be provided. For example, display properties of content such as, for example, CSS font, color, and the like may be modified when displayed on a community page based on a community theme. Such a community theme may be implemented as CSS tokens defined in that community for, for example, color, fonts, etc. FIGS. 13A and 13B, described below, illustrate example interfaces for selecting community theming options for color and font, respectively.

Thus, in such alternate enhanced JSON embodiments, a CMS Connect functionality may be augmented to allow a user to bring lists of data, such as files or articles, blogs, news items, or any content that may not only be presented in a community web page, but that may also be interacted with in the community. In embodiments, the example system 400, shown in FIG. 4 and described in detail above, may be used to retrieve JSON content from an external CMS system. As noted above, such a system may include four main components: a remote CMS system 401 acting as the content source; a series of panels in a community builder settings interface 403 to allow a community administrator to define how to contact the remote system; a UI component and a template 405 where to show the remote content; and a server 407 that can act as a gateway, pre-processor, and cache for the remote content. As noted above in connection with FIG. 4, these four components of an example system may be thought as a model, made of (1) the content, (2) some settings, (3) a view, and (4) a controller.

Thus, in such JSON enabled embodiments, using a CMS Connect JSON integration, contents including blogs, articles etc. from an external CMS system may be brought into a community to allow reusability and centralize an organization's content creation and editorial processes. Moreover, such embodiments may be built generically to support other types of data integration like XML, Rest etc., and may support bringing authenticated content from external system into a community and its various community web pages.

In such embodiments, as in the case of HTML, CSS and JS content described above, JSON data is not stored in a community webpage, or the community within the enterprise platform. Rather, in embodiments, it may be retrieved from an external CMS System. In embodiments, JSON content may be retrieved using a client side XMLHttpRequest (XHR) call, for example, if JSON API access is public. (It is here noted that XHR is an API in the form of an object whose methods transfer data between a web browser and a web server. Despite the name, XHR can be used with protocols other than HTTP and data can be in the form of not only XML, but also JSON. HTML or plain text.)

Alternatively, if it is authenticated data, for example, where JSON API access is behind authentication protocols such as, for example, OAuth or Simple Authentication, in embodiments, JSON Content may be retrieved through a secured server side proxy.

Because raw data will be retrieved from JSON, in embodiments a presentation layer for it may be provided in communities. In CMS Connect JSON based integrated embodiments, there may be provided separation of UI layouts, data provider sources and how they bind together. In embodiments, a presentation layer may be provided where an out-of-box layout component to display a collection or list of contents may be shown using, for example, a CMS Connect client side unauthenticated client side XHR data provider or, for example, an authenticated server side data provider and a JSON data binding provider.

Referring in detail to a community component that provides separation of UI layouts, data provider sources and how they bind together, in embodiments, several aspects of user flexibility may be implemented. First, a few out-of-the-box (OOTB) UI layouts, may be provided, but flexibility for a user or customer to define their own layout may also be given. Second, an OOTB data binding provider may be provided, but flexibility for a user or customer to define their own transformer or parser may be implemented. Finally, an OOTB data provider may be provided, but flexibility for customer to define their own data provider may be implemented.

In embodiments, an example CMS Connect JSON Component may have three levels of abstraction, as follows, including a UI/Layout/Renderer, a Data Source Provider, and a Data Binding Provider. These are next described.

A UI Layout/Renderer may provide a way for defining an UI layout for the presentation layer. Customization ability to make any community component a content layout may be supported.

A Data Source Provider may create an abstraction layer to plug in any data source for, for example: unauthenticated client side XHR CMS Connect data provider; authenticated server side CMS Connect data provider, an enterprise platform data provider (e.g. SOAP or REST based). In this latter connection it is noted that, generally speaking, web services may be of two types: Simple Object Access Protocol (SOAP) and Representational State Transfer (REST). SOAP defines a standard communication protocol (set of rules) specification for XML-based message exchange. SOAP uses different transport protocols, such as HTTP and SMTP.

Finally, in embodiments, a Data Binding Provider may define a binding between layout (community design properties) and Data Provider Properties.

Figure 12:
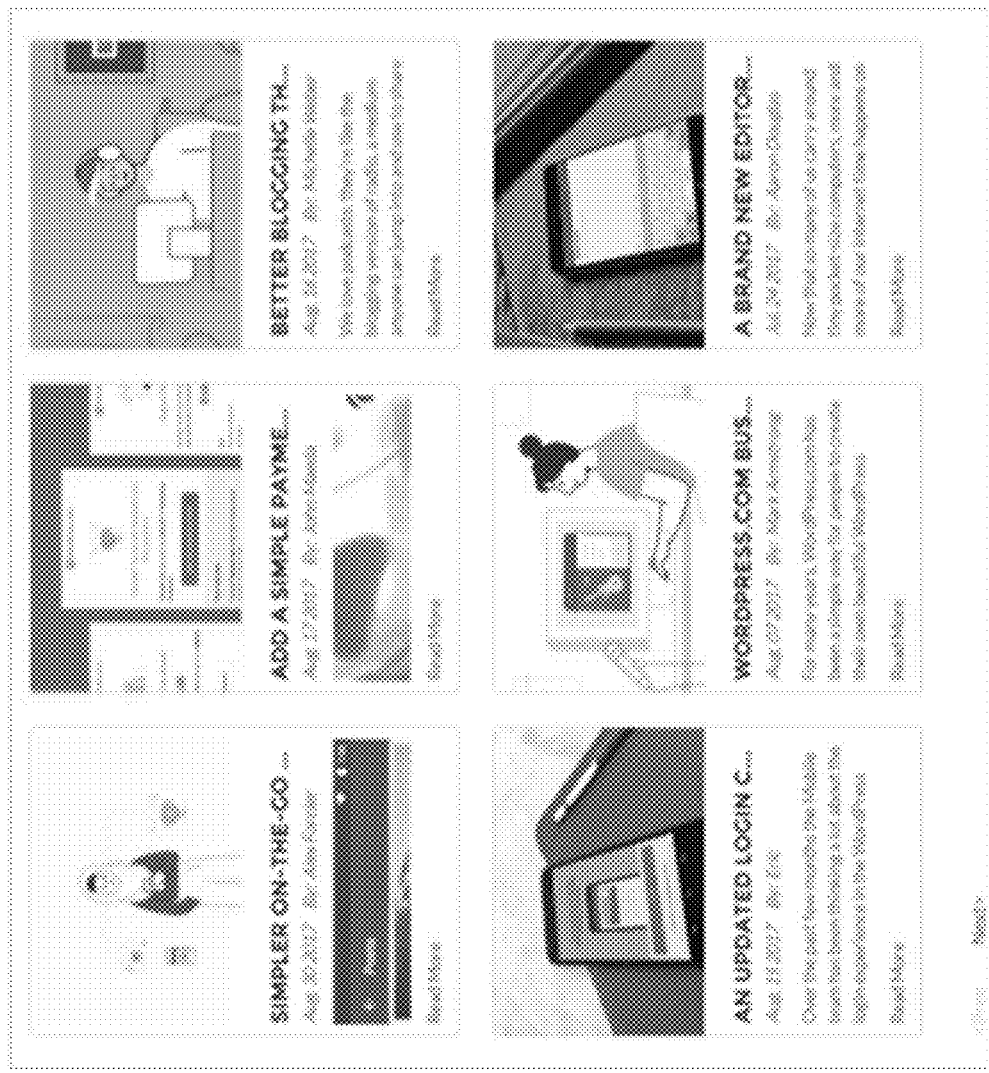
FIG. 12 illustrates an example list view of blogs to display on a user's community webpage, according to enhanced implementations that support Java Script Object Notation (JSON) content.
Figure 13:
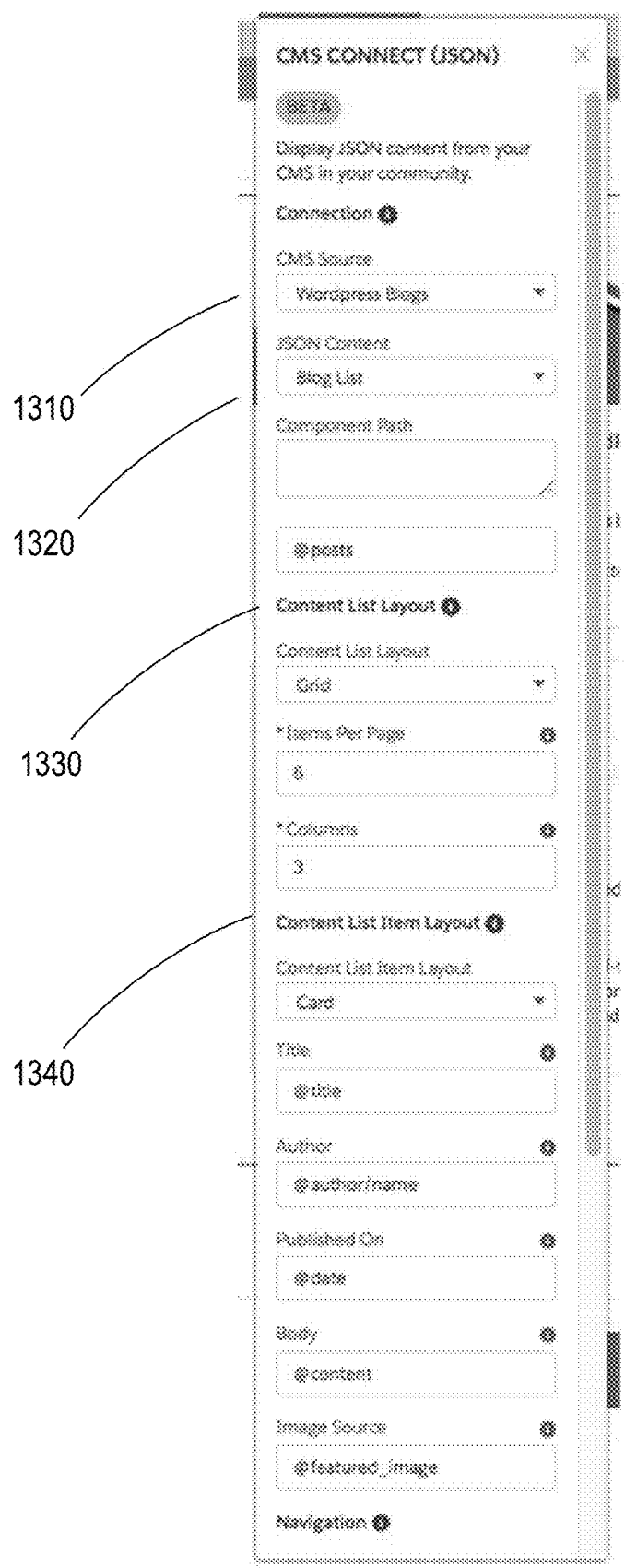
FIG. 13 illustrates an example property editor to facilitate displaying JSON content from a remote CMS on an example community webpage, according to some enhanced implementations.
Figure 13A:
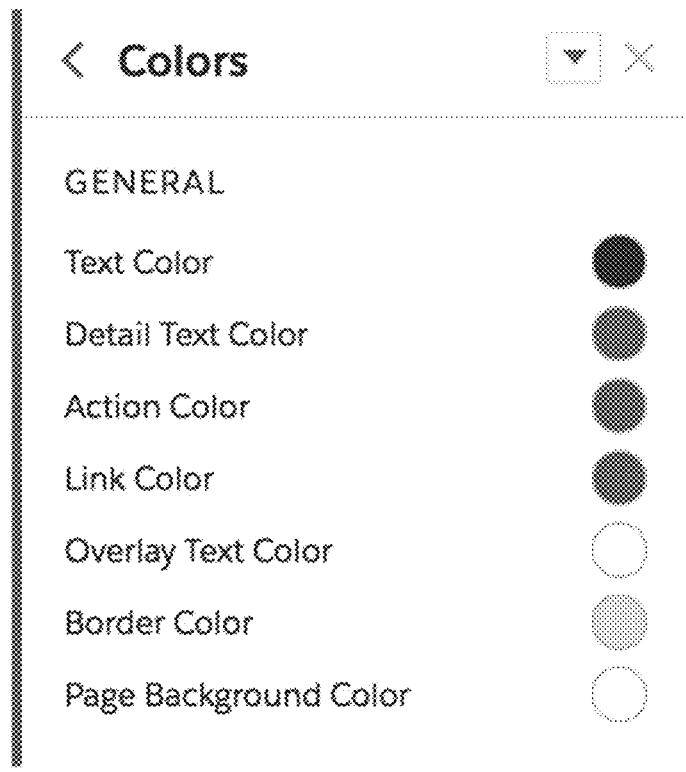
FIG. 13A illustrates an example color theme interface whereby a user may set colors for the display of JSON content retrieved from a remote CMS on an example community webpage, according to some enhanced implementations.
Figure 13B:
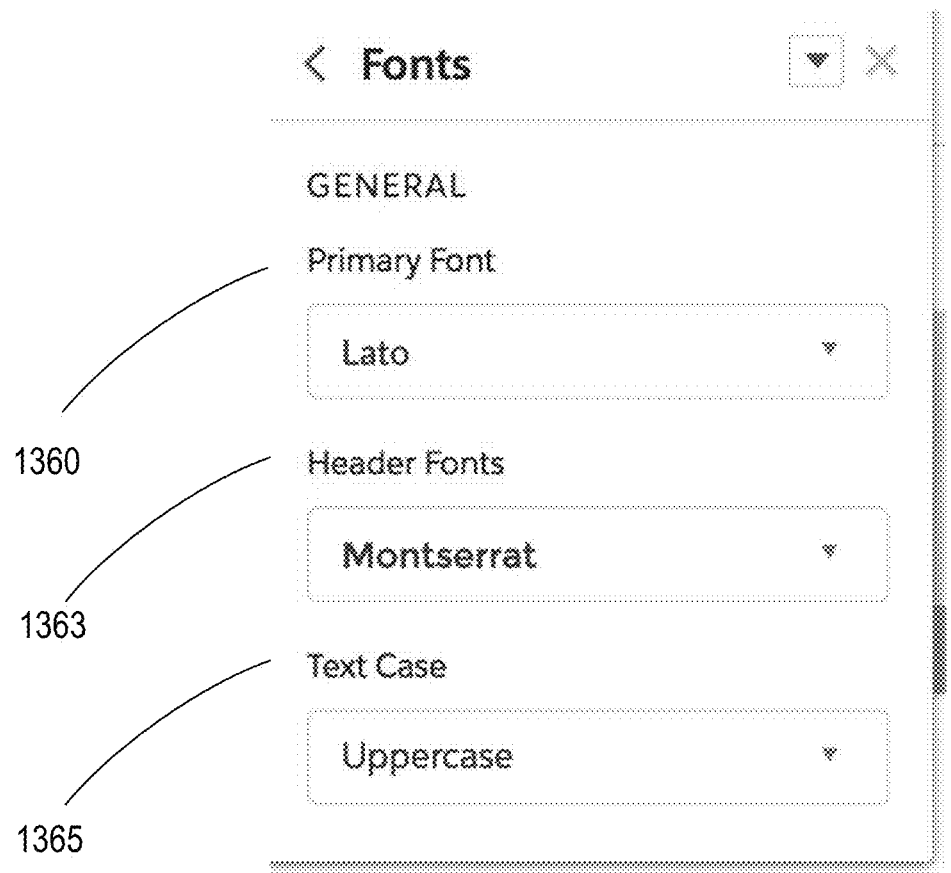
FIG. 13B illustrates an example font theme interface whereby a user may set fonts for the display of JSON content retrieved from a remote CMS on an example community webpage, according to some enhanced implementations.
Figure 14:
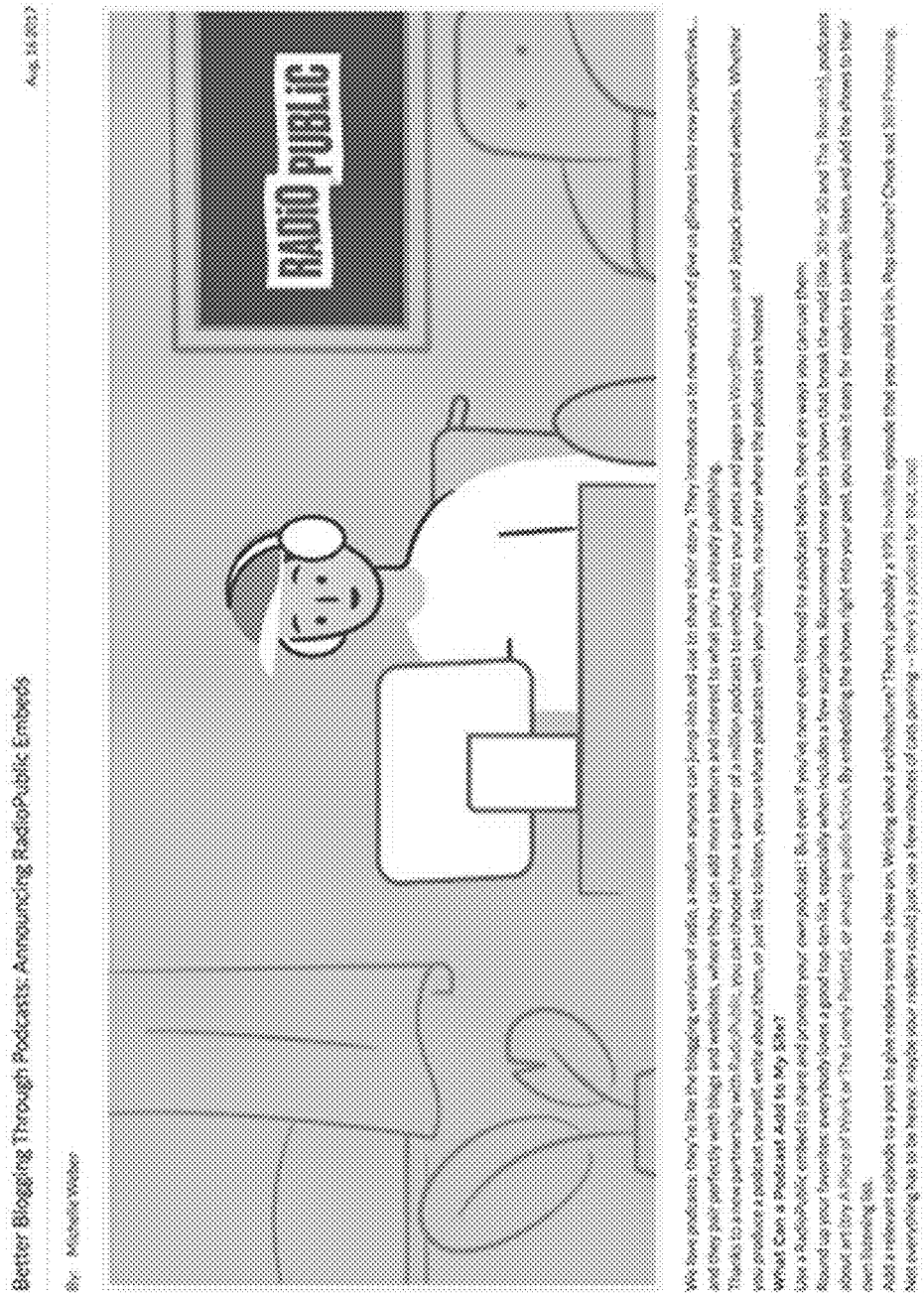
FIG. 14 illustrates an example detailed view of one of the JSON content blogs shown in FIG. 12, according to some enhanced implementations.

FIGS. 12 through 14, next described, illustrate retrieval and display of JSON content from an external CMS system in such enhanced alternate embodiments of a CMS Connect system. With reference to FIG. 12, a list view of example blogs, as may be displayed according to some embodiments, is shown.

FIG. 13 depicts an example CMS Connect (JSON) property editor, by which a user or customer may specify a source of JSON content to be displayed in an example community page, as well as how it is to be displayed on the community web page. Such a property editor may be accessible to a user as a drop down menu in a community builder user interface provided in the communities portion of an enterprise network platform. With reference thereto, a CMS Source 1310 may be specified, such as "Wordpress Blogs", for example. These blogs may be, for example, maintained on a web page or pages outside the community, which the organization maintaining the community web age now wishes to also display within the community. At 1320 there may be a JSON Content field, by which the user may specify how the source content is to be displayed, for example, as a blog list. This is what creates the list view of six blogs as shown in FIG. 12, for example.

Continuing with reference to FIG. 13, there may further be provided a content list layout 1330 field, where a user may specify the manner of displaying the JSON content, how many content items per page, and how many columns. Finally, as to each item in the content list layout, in a content list item layout field, further details may be specified.

Finally, from the list view UI of FIG. 12, a viewer of the community web page, for example a customer of the organization maintaining the community web page, may select one of the content items for detailed viewing. FIG. 14 illustrates such a detail UI view, here of the blog shown in the top row, center column, of FIG. 12.

As noted above, for alternate embodiments that support CMS Connect JSON, community branding support may be provided. For example, display properties of content such as, for example, CSS font, color, and the like may be modified when displayed on a community page based on a community theme. Such a community theme may be implemented as CSS tokens defined in that community for, for example, color, fonts, etc. FIGS. 13A and 13B, described below, illustrate example interfaces for selecting community theming options for color and font, respectively.

FIG. 13A illustrates an example interface for choosing color themes for a community in accordance with various implementations. With reference thereto, at 1350, a user may select a different color for each of text, text detail, action, link, overlay text, borders, or page background. Once such color themes are chosen, external JSON content retrieved form an external CMS may be displayed in conformance to the community color themes, and not according to the original display properties of the JSON content on the external website.

FIG. 13B illustrates an example interface for choosing font themes for a community, in accordance with various implementations. With reference thereto, at 1360, a user may select a primary font to be used in the community. Similarly, at 1363 a user may select a header font, and at 1365, the user may select which case text is to be displayed in, in the community, and thus its web page(s).

Figure 15:
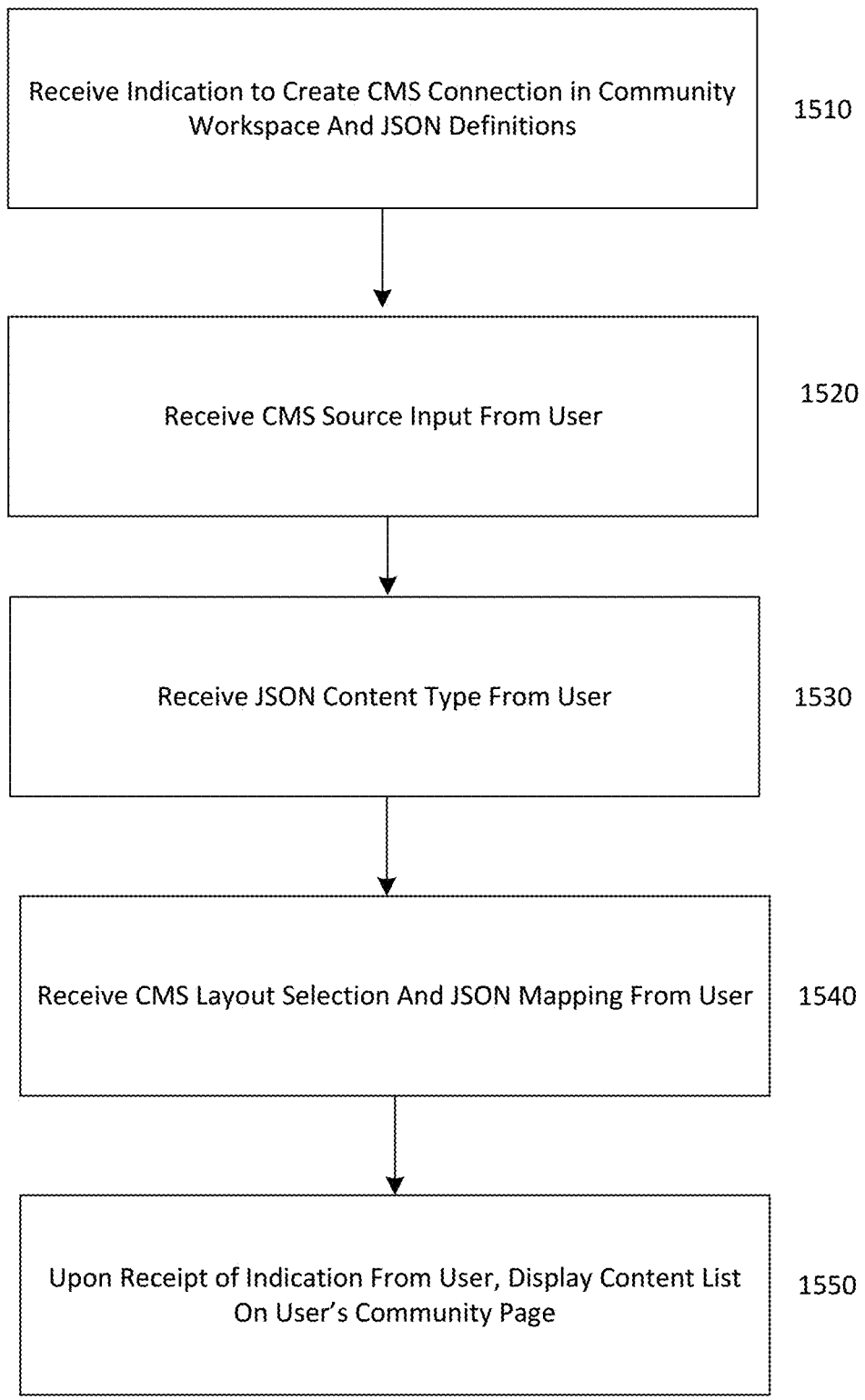
FIG. 15 an overview of the operational flow for a process to receive user input for the display of JSON content and to display the user chosen content on a community page, according to some enhanced implementations.

Referring now to FIG. 15, FIG. 15 illustrates an overview of the operational flow for a process 1500 to receive user input for the display of JSON content and for display of the user chosen content on a community page, according to various user specified parameters, according to some implementations. Process 1500 may be performed by a computer or data processing device or system in connection with a user entering various inputs, such as via a JSON content display interface, such as shown, for example, in FIG. 13, described above.

Process 1500 may include blocks 1510 through 1550. In alternate embodiments, process 1500 may have more or less operations, and some of the operations may be performed in different order. Process 1500 may be implemented via a CMS connection user interface, such as, for example, that illustrated in FIG. 14, and described above, within a social platform. As noted above, FIG. 14 depicts an example property editor to facilitate displaying JSON content from a CMS on an example community webpage. The property editor of FIG. 14 thus allows a user to specify various details regarding display of JSON content, which a computer or processor may then implement within a community webpage.

With reference to FIG. 15, process 1500 may begin at block 1510, where a computer or processor may receive, from a user, an indication to create a new CMS connection in a community workspace, as well as JSON definitions. From block 1510, process 1500 may proceed to block 1520, where the computer may receive a CMS source input from the user, such as, for example, "Wordpress Blogs" as shown in FIG. 13. From block 1520, process 1500 may proceed to block 1530, where the computer may receive JSON content type specification from the user, such as by the user entering the content type at filed 1320 of FIG. 13. From block 1530, process 1500 may proceed to block 1540, where the computer may receive from the user a CMS layout selection and a JSON mapping for the attributes. In embodiments, as described above, the CMS layout may be chosen from several out-of-the-box layouts, such as "grid". For example. Finally, from block 1540, process 1500 may proceed to block 1550, where, upon receipt of an indication from the user, such as, for example, the user clicking or otherwise interacting with a "Save" button, widget or the like, the computer may display the specified JSON content list.

Figure 16:
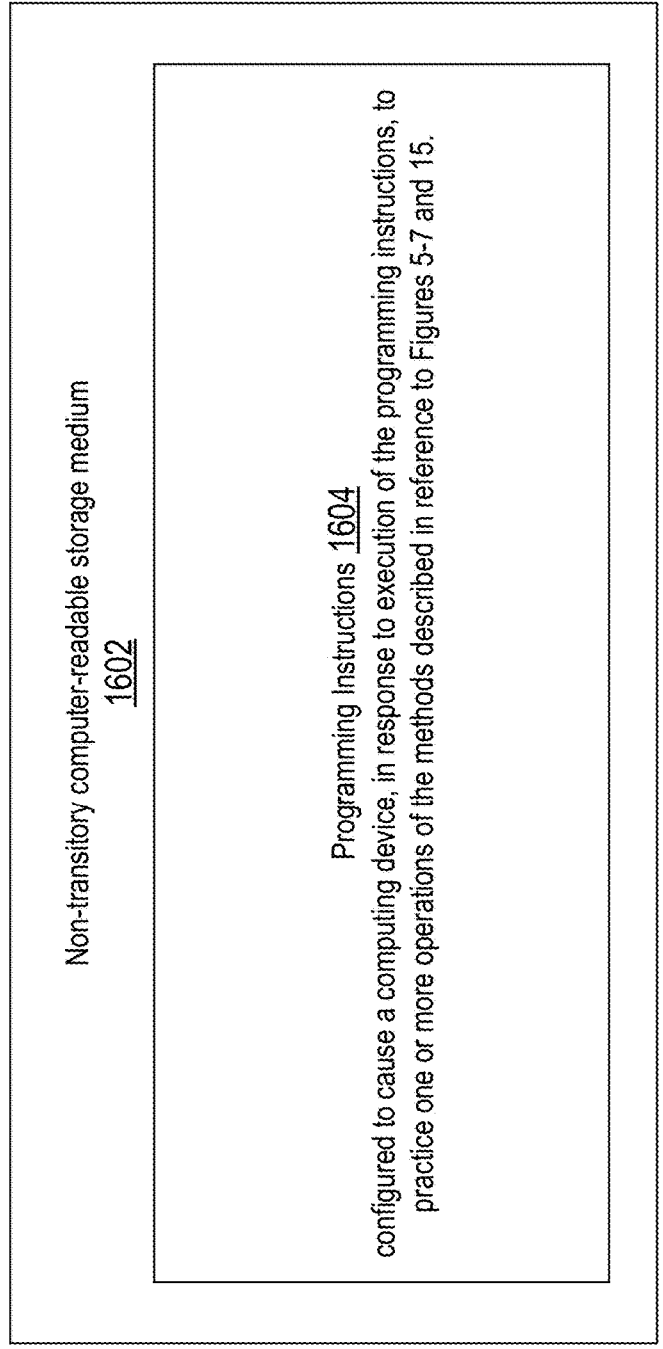
FIG. 16 illustrates an example computer-readable storage medium having instructions configured to practice aspects of the processes of FIGS. 5-7 and 15, according to some implementations.

FIG. 16 illustrates an example computer-readable storage medium having instructions configured to implement all (or portion of) software implementations of System 16 or User System 16 of FIG. 1A, Application Setup Mechanism 38, Save Routines 36, PL/SOQL 34, Tenant Management Process 110, System Process 102, Tenant Processes 104, API 32, UI 30 of FIG. 1B, and/or practice (aspects of) processes 500 of FIG. 5, 600 of FIGS. 6, and 1500 of FIG. 15, earlier described, in accordance with various embodiments. As illustrated, computer-readable storage medium 1602 may include the executable code of a number of programming instructions or bit streams 1604. Executable code of programming instructions (or bit streams) 1604 may be configured to enable a device, e.g., System 16 or User System 16 of FIG. 1A, in response to execution of the executable code/programming instructions (or operation of an encoded hardware accelerator 1705), to perform (aspects of) process 500 of FIG. 5, 600 of FIG. 6 and/or 1500 of FIG. 15. In alternate embodiments, executable code/programming instructions/bit streams 1604 may be disposed on multiple non-transitory computer-readable storage medium 1602 instead. In embodiments, computer-readable storage medium 1602 may be non-transitory. In still other embodiments, executable code/programming instructions 1604 may be encoded in transitory computer readable medium, such as signals.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples may include those with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed. Thus, in general, implementations may be practiced without use of multi-tenant databases, and without deployment on application servers.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A non-transitory computer-readable storage medium (NTCRSM) comprising instructions, the instructions, when executed, are operable to cause a computer to:
   receive a request to obtain a webpage maintained within a platform, the webpage including embedded settings that refer to content on one or more remote servers;
   retrieve, at a rendering time of the webpage, content from the one or more remote servers, based at least in part on the embedded settings;
   process the retrieved content in a secured environment of the webpage isolated from other environments of the webpage based on a namespace of the retrieved content different from other namespaces of other content to be rendered in the other environments, wherein processing the retrieved content in the secured environment includes:
      evaluate script of the retrieved content in the secured environment to prevent execution of erroneous or malicious code,
      sanitize markup language of the retrieved content to prevent injection of script external to the retrieved content outside of the secured environment,
      hide existence and characteristics of the one or more remote servers, and
      only load external content into the webpage from sources indicated by a Content Security Policy (CSP); and
   insert the retrieved content into an isolated custom window of the webpage, the isolated custom window being associated with the namespace of the retrieved content; and
   render the other content in the other environments of the webpage.

2. The NTCRSM of claim 1, wherein the script of the retrieved content is JavaScript, the markup language of the retrieved content is Hypertext Markup Language (HTML), and the retrieved content further includes one or more of page level Cascading Style Sheets (CSS) and one or more HTML fragments, and the namespace of the retrieved content has access to a secure Document Object Model (DOM) different than a DOM of the webpage such that components associated with the other namespaces are inaccessible to the retrieved content.

3. The NTCRSM of claim 1, wherein the content includes one or more of carousels, blog posts, ads, mini applications, widgets, maps, weather information, or securities or commodities charts or prices.

4. The NTCRSM of claim 1, wherein the instructions, when executed, are further operable to cause the computer to:

retrieve the content from a content delivery network (CDN), reverse-proxy or dispatcher communicatively coupled to the one or more remote servers.

5. The NTCRSM of claim 1, further comprising code, that when executed causes the computer to hide existence and characteristics of the one or more remote servers from a viewer of the webpage.

6. The NTCRSM of claim 5, wherein to hide the existence and characteristics of the one or more remote servers includes use of a proxy that hides the one or more remote servers behind a servlet.

7. The NTCRSM of claim 1, wherein the instructions, when executed, are further operable to cause the computer to:
retrieve the content from a content cache communicatively coupled to the one or more remote servers through a gateway.

8. The NTCRSM of claim 7, wherein the content is first processed to comply with defined security rules prior to being stored in the content cache.

9. The NTCRSM of claim 1, wherein the instructions, when executed, are further operable to cause the computer to:
process the retrieved content according to one or more stability protocols.

10. The NTCRSM of claim 9, wherein process retrieved content according to one or more stability protocols includes to scope external CSS to prevent conflict with styles required to display webpages in the platform.

11. The NTCRSM of claim 1, wherein the instructions, when executed, are further operable to cause the computer to:
modify display parameters of the content according to local settings of either the webpage or the platform.

12. A method of securely inserting portions of HTML pages maintained on external web servers into a webpage, the method comprising:
receiving a request to obtain the webpage maintained within a platform, the webpage including embedded settings that refer to content on one or more remote servers;
retrieving, at a rendering time of the webpage maintained within the platform, content from the one or more remote servers based at least in part on the embedded settings;
processing the retrieved content in a secured environment of the webpage isolated from other environments of the webpage based on a namespace different from other namespaces of other content to be rendered in the other environments, and the processing the retrieved content in the secured environment comprises:
evaluating a script of the retrieved content in the secured environment to prevent execution of erroneous or malicious code,
sanitizing markup language of the retrieved content to prevent injection of a script external to the retrieved content outside of the secured environment,
hiding characteristics of the one or more remote servers, and
only loading external content into the webpage from sources indicated by a Content Security Policy (CSP);
inserting the retrieved content into the secured environment of the webpage maintained within the platform;
rendering the other content in the other environments of the webpage; and
rendering the retrieved content in the secured environment of the webpage, the secured environment being associated with the namespace of the retrieved content.

13. The method of claim 12, wherein the script of the retrieved content is JavaScript, the markup language of the retrieved content is Hypertext Markup Language (HTML), and the retrieved content further includes one or more of page level Cascading Style Sheets (CSS) and one or more HTML fragments, and the namespace of the retrieved content having access to a secure Document Object Model (DOM) different than a DOM of the webpage such that components associated with the other namespaces are inaccessible to the retrieved content.

14. The method of claim 12, wherein the content includes one or more of carousels, blog posts, ads, mini applications, widgets, maps, weather information, or securities or commodities charts or prices.

15. The method of claim 12, further retrieving the content from a content delivery network (CDN), reverse-proxy or dispatcher communicatively coupled to the one or more remote servers.

16. The method of claim 12, further comprising causing the computer to hide the existence and characteristic of the one or more remote servers.

17. The method of claim 16, wherein to hide the existence and characteristic of the one or more remote servers includes using a proxy that hides the one or more remote servers behind a servlet.

18. The method of claim 12, further comprising retrieving the content from a content cache communicatively coupled to the one or more remote servers through a gateway.

19. The method of claim 18, wherein the content is first processed to comply with defined security rules prior to being stored in the content cache.

20. The method of claim 12, further comprising processing the retrieved content according to one or more stability protocols.

21. The method of claim 20, wherein processing retrieved content according to one or more stability protocols includes scoping external CSS to prevent conflict with styles required to display webpages in the platform.

22. The method of claim 12, further comprising modifying display parameters of the content according to local settings of either the webpage or the platform.

23. The method of claim 12, wherein the content includes JavaScript Object Notation (JSON) content stored on a content management system server.

* * * * *